(12) United States Patent
Khan et al.

(10) Patent No.: US 11,226,425 B2
(45) Date of Patent: Jan. 18, 2022

(54) METHOD OF COMPRESSING SEISMIC WAVES USING GABOR FRAMES FOR SUBSURFACE GEOLOGY CHARACTERIZATION

(71) Applicant: King Fahd University of Petroleum and Minerals, Dhahran (SA)

(72) Inventors: Hamood Khan, Dhahran (SA); Salam A. Zummo, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 349 days.

(21) Appl. No.: 16/590,906

(22) Filed: Oct. 2, 2019

(65) Prior Publication Data
US 2021/0103066 A1    Apr. 8, 2021

(51) Int. Cl.
    G01V 1/30    (2006.01)
    G01V 1/34    (2006.01)
    G01V 1/22    (2006.01)

(52) U.S. Cl.
    CPC ............... G01V 1/306 (2013.01); G01V 1/22 (2013.01); G01V 1/34 (2013.01); G01V 2210/40 (2013.01); G01V 2210/50 (2013.01)

(58) Field of Classification Search
    USPC .......................................................... 702/14
    See application file for complete search history.

(56) References Cited

U.S. PATENT DOCUMENTS

2008/0109168 A1* 5/2008 Koren ..................... G01V 1/32
                                                              702/16

2011/0069581 A1* 3/2011 Krohn ................... G01V 1/364
                                                              367/43

(Continued)

FOREIGN PATENT DOCUMENTS

CA      2 727 415 A1    12/2009
CN      105259572 A      1/2016

(Continued)

OTHER PUBLICATIONS

Chen, L., Wu, R.S., and Chen, Y. Target-Oriented Beamlet Migration Based on Gabor-Daubechies Frame Decomposition. Geophysics[online]. vol. 71, No. 2, pp. S37-S52, Mar. 2006 [retrieved on Nov. 3, 2021]. Retrieved from the Internet: <URL: https://library.seg.org/doi/10.1190/1.2187781 >. (Year: 2006).*

(Continued)

*Primary Examiner* — Paul D Lee
(74) *Attorney, Agent, or Firm* — Oblon, McClelland, Maier & Neustadt, L.L.P.

(57) ABSTRACT

A method of compressing data from seismic waves using Gabor frames utilizes a plurality of geophones positioned within a region of interest. Each of the plurality of geophones is communicably coupled with at least one remote server. Thus, a plurality of reflected-seismic signals received through the plurality of geophones can be transmitted to the at least one remote server for analyzing and calculations. The plurality of reflected-seismic signals is converted into a set of Gabor frames, wherein the Gabor frames is generated via a plurality of prolate spheroidal wave functions (PSWF). A Gabor frame-generating calculation module utilizes the plurality of PSWF to generate the set of Gabor frames. A dual frame for each of the set of Gabor frames is derived and used for quantization purposes. Preferably, a tree structured vector quantization process is followed.

12 Claims, 13 Drawing Sheets

(56) References Cited

U.S. PATENT DOCUMENTS

2011/0218737 A1 9/2011 Gulati
2020/0025958 A1* 1/2020 Kamil Amin .......... G01V 1/362

FOREIGN PATENT DOCUMENTS

EP 0 132 807 A2 7/1984
WO 2018/195131 A1 10/2018

OTHER PUBLICATIONS

Geng, et al. ; Efficient Gaussian Packets representation and seismic imaging ; SEG Technical Program Expanded Abstracts ; Jan. 2011 ; 7 Pages.

* cited by examiner

METHOD OF COMPRESSING SEISMIC WAVES USING GABOR FRAMES FOR SUBSURFACE GEOLOGY CHARACTERIZATION

BACKGROUND

Field of the Invention

The present disclosure generally relates to a method of compressing seismic wave data to be used for subsurface structure characterization. More specifically, the present disclosure introduces a method of compressing seismic waves through the use of multiple Gabor frames.

Description of the Related Art

Currently a large quantity of data is acquired in seismic exploration. The process of data acquisition is the first stage of the signal processing process. With advancements in the use of acoustic sensors, the data acquisition is expected to increase exponentially in the near future. Thus, in order to develop high-quality seismic maps of the subsurface through the acquired data, an effective method for handling large quantities of data is essential. In other words, high-quality depth images are obtained through accurate acquisition and better statistical sampling. The high-quality seismic maps are used to understand the subsurface characteristics of a region. Hence, the occurrence of natural resources can be investigated as preferred. Seismic maps are useful to both geologists and geophysicists for needs such as deriving a target depth estimate for a proposed well location.

Seismic refraction or seismic reflection is generally used for data acquisition purposes. Seismic refraction is typically used at shallow depths. On the other hand, seismic reflection is typically used at depths greater than 100-feet. In general, seismic reflection can be used for depths up to 10 kilometers. Seismic refraction uses the refraction of seismic waves on geological layers and rock/soil units to characterize the subsurface geologic conditions. The method of the present disclosure is related to seismic reflection, where a wave train of reflected seismic signals are examined at the acoustic sensors. When utilizing seismic reflection for data acquisition, the ground in which the method is implemented on is initially injected with an energy source. The injected energy is reflected from the subsurface layers of differing acoustic impedance as a seismic wave and is received at the acoustic sensors at the surface. The method of the present disclosure uses geophones as acoustic wave sensors during the data acquisition process.

Data acquisition is the process of sampling signals that measure real world physical conditions and converting the resulting samples into digital numeric values that can be manipulated by a computer. Data acquisition systems, abbreviated by the acronyms DAS or DAQ, typically convert analog waveforms into digital values for processing. The components of data acquisition systems can include sensors, signal-conditioning circuitry, analog-to-digital converters, and data acquisition applications. The sensors convert physical parameters to electrical signals. The signal conditioning circuitry convert sensor signals into a form that can be converted to digital values. Analog-to-digital converters convert conditioned sensor signals to digital values. Data acquisition applications are usually controlled by software programs developed using various general purpose programming languages such as Assembly, BASIC, C, C++, C#, Fortran, Java, LabVIEW, Lisp, Pascal, etc. Stand-alone data acquisition systems are often called data loggers.

There are also open-source software packages providing tools to acquire data from different hardware equipment. These tools come from the scientific community where complex experiment requires fast, flexible and adaptable software. Those packages are usually custom fit but more general DAQ packages like the Maximum Integrated Data Acquisition System can be easily tailored and is used in several physics experiments worldwide.

A geophone is a ground motion transducer that is used by geophysicists and seismologists to convert ground movement into voltage. Therefore, geophones can receive reflected energy from subsurface layers and convert the reflected energy into a digitized voltage. To fulfill the intended functionalities, a typical geophone consists of a mass suspended by means of mechanical springs. The geophone housing and the suspended mass starts to move with the application of a velocity at frequencies lesser than the resonance frequency. On the other hand, the mass will remain stationary for frequencies greater than the resonance frequency. The movement of the mass is based on either magnets or coils, and the response of the coil/magnet is proportional to the ground velocity. Generally, the mass is wire-wrapped so that the movement of the mass within a magnetic field results in a corresponding voltage. Next, the subsurface layers that resulted in the reflected energy are mapped via the voltage generated through the geophones.

With the overall shift towards large scale data acquisition, a 10 to 100 fold increase in geophone count is underway. See S. Savazzi, U. Spagnolini, L. Goratti, D. Molteni, M. Latva-aho and M. Nicoli, "Ultra-wide band sensor networks in oil and gas explorations," in *IEEE Communications Magazine*, vol. 51, no. 4, pp. 150-160, April 2013, incorporated herein by reference in its entirety. Future node densities are forecasted to be even higher, with some surveys aiming to achieve a density of 1 million nodes per survey. See Stefano Savazzi and Umberto Spagnolini, "Compression and coding for cable-free land acquisition systems", *Geophysics*, Vol. 76, No. 5, September-October 2011, incorporated herein by reference in its entirety.

A second trend is towards completely wireless data acquisition resulting in a huge increase in the handled data rate. Typically, a survey conducted for seismic exploration covers an experimental area of about 2500-square kilometers ($km^2$) with geophone receivers stationed at 10 meter (m)-25 m intervals. Therefore, a quantity of approximately 50K-100K geophone receivers needs to be used to cover the entirety of the experimental area. Given that the geophones operate at 2-millisecond intervals, with a bit depth of 24-bits, and a shot measurement lasting 6-seconds, the total aggregate rate of the network will be in the order of 1-Gigabyte per second (GB/s) which is comparable to the data traffic of a medium-sized city.

Since the wireless network throughput for a single sensor node is typically low (approximately 100-kilobytes per second), an efficient signal compression method needs to be implemented to the seismic waves before a recording process is executed. The process of compression involves discretizing continuous valued amplitudes at each spatial location and removing the redundancy in the discretized data to achieve compaction in size. With these existing compression methods that discretize data to achieve compaction in size, data is lost through lossy-source coding in information theory parlance.

One objective of the present disclosure is to address the aforementioned issues. More specifically, the present disclosure introduces a method for compressing data from seismic signals in order to aid with subsurface structure characterization. In doing so, the present disclosure utilizes multiple Gabor frames that are generated through Prolate Spheroidal Wave Functions (PSWF) also known as Slepian functions. By doing so, good time-frequency localization of the seismic signal is achieved, wherein the seismic signal is time-varying and has different frequency content at different times.

The use of Gabor frames generated by PSWF is dictated by the fact that the PSWF are bandlimited and maximally time/space concentrated on a finite interval. As such to form an orthonormal basis for the Pailey-Wiener space of functions bandlimited to say the interval $[-\Omega, \Omega]$. Since seismic signals are bandlimited in temporal frequency and have a domain on finite time intervals and space volumes, the seismic signals are expanded using a Gabor frame of PSWF. From these Gabor frames a Wilson basis which provides an unconditional expansion for seismic traces is obtained. Unconditional expansions are optimal for data compression for signal classes belonging to certain function spaces. See Donoho D. L., "Unconditional Bases are Optimal Bases for Data Compression and for Statistical Estimation", in *Journal of Constructive Approximation*, vol. 4, pp. 1024-1044, 1995, incorporated herein by reference in its entirety.

Previous work related to seismic compression with fixed transform is based on orthogonal transform, e.g., Lapped Orthogonal Transforms (LOT) and the Generalized Lapped Orthogonal Transform (GenLOT). See T. Berger, *Rate Distortion Theory: A Mathematical Basis for Data Compression*, ser. Information and System Sciences Series. Englewood Cliffs, N.J.: Prentice-Hall, 1971. Dragotti, Pier Luigi and Michael Gastpar, Distributed source coding: theory, algorithms, and applications, Elsevier Inc., 2009; and Grenander, U. and G. Szego, *Toeplitz Forms and Their Applications*, UC Berkley Press, Berkeley and Los Angeles, Calif., 1958, each incorporated herein by reference in their entirety. Other works include time-scale tools like wavelets, Shearlets and Curvelets. See D. Slepian and J. K. Wolf, "Noiseless coding of correlated information sources," *IEEE Trans. Inf. Theory*, vol. 19, no. 4, pp. 471-480, July 1973; and D. Slepian and J. K. Wolf, "Noiseless coding of correlated information sources," *IEEE Trans. Inf. Theory*, vol. 19, no. 4, pp. 471-480, July 1973, each incorporated herein by reference in their entirety. Still other works are based on local cosine basis and local fourier bases. See B. Beferull-Lozano and R. L. Konsbruck, "On source coding for distributed temperature sensing with shift-invariant geometries," *IEEE Trans. Commun.*, vol. 59, no. 4, pp. 1053-1065, April 2011, incorporated herein by reference in its entirety. None of these studies however, deal with redundant transformations like Gabor representations that are over-complete. As noted by many researchers (Casazza et al.) Gabor representations are frames that are robust to quantization effects giving increased performance in compression. See Peter G. Casazza, Gitta Kutyniok, Eds. Finite Frames: Theory and Applications, Springer Science, 2013, incorporated herein by reference in its entirety.

Therefore, the compression method described herein is superior to time-scale tools such as curvelets and shearlets. Moreover, the method introduced in the present disclosure is shown to provide better results than traditional seismic compression methods based on lapped orthogonal transform and generalized lapped orthogonal transforms.

SUMMARY OF THE INVENTION

A method of compressing data obtained from seismic waves for subsurface geological characterization consists of a plurality of geophones within a region of interest and at least one remote server. The plurality of geophones is communicably coupled with the at least one remote server. In order to initiate the data acquisition process, an energy source transmits energy waves into the subsurface within the region of interest. The method of the present disclosure utilizes seismic reflection for subsurface characterization. Therefore, the plurality of geophones receives the reflected-seismic waves that were generated from the energy waves transmitted into the region of interest. The calculation method of the present disclosure generates Gabor frames for data from the reflected-seismic waves through Prolate Spheroidal Wave Functions. Subsequently, a quantization process is executed for the Gabor frames. The quantization process is then utilized to analyze and develop a map of the subsurface geological formations that resulted in the reflected-seismic waves.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
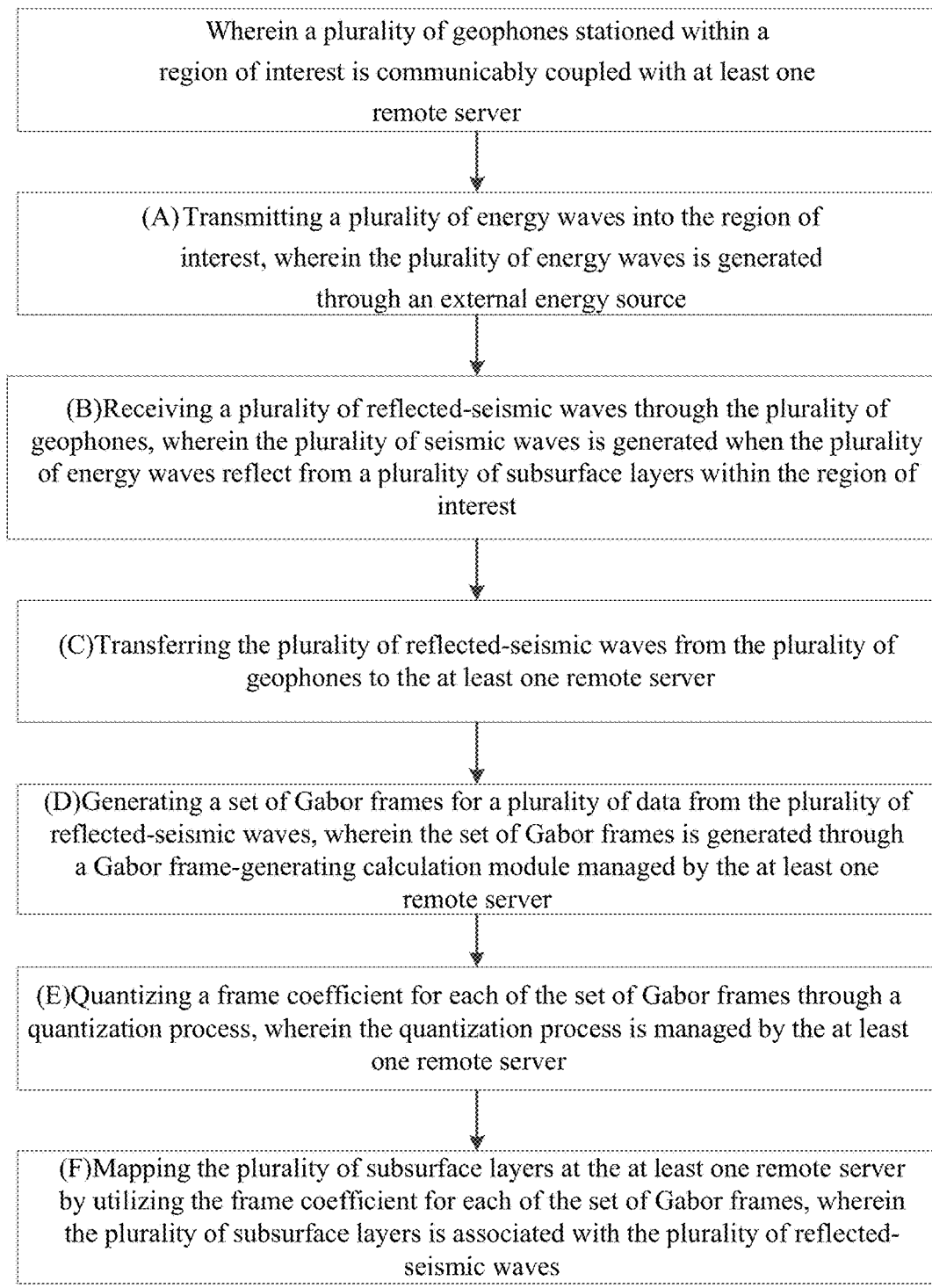
FIG. 1 is a flowchart illustrating the basic overall process of the present disclosure.

All illustrations of the drawings are for the purpose of describing selected versions of the present disclosure and are not intended to limit the scope of the present disclosure.

The present disclosure describes a method for compressing seismic signals for improved subsurface structure characterization. More specifically, the present disclosure describes a method of converting seismic data received through geophones into Gabor frames, wherein the Gabor frames are generated through Prolate Spheroidal Wave functions, and quantizing the Gabor frames to develop depth images of subsurface structures.

In order to fulfill the intended functionalities, a plurality of geophones is stationed within a region of interest wherein each of the plurality of geophones is associated with a spatial location within the region of interest. The plurality of geophones is used to convert ground movement into voltage. Generally, in a geophone, a motion-sensitive transducer is used to convert ground motion into an electrical signal. A deviation of the measured voltage from a baseline voltage represents a seismic response of the subsurface within the region of interest. Each of the plurality of geophones can be either a passive analog device or be based upon microelectromechanical systems (MEMS) technology. The passive analog devices generally consist of a spring-mounted wire coil moving within the field of a permanent magnet. The movement of a coil within a magnetic field generates a resultant electric signal. When MEMS technology is used, an electric response is generated according to the ground motion through an active feedback circuit.

In one embodiment, the plurality of geophones can be selected from, but is not limited to, SG-5, SG-10HS, SG-10, SGH-10, JF-20DX, G-SG-1V, G-SG-1H, G-SG-2V, G-SG-2H, and can be categorized as high-sensitivity, high-performance, or conventional. In general, the plurality of geophones is selected to provide accurate results with high-reliability under extreme working conditions. As an example, the plurality of geophones needs to withstand temperatures that can vary from approximately −40-Centigrade (° C.) to +80° C. Seismic waves passing through the subsurface are three-dimensional in nature. In general, a vertical position is used when responding to the seismic waves. However, the operating position for the plurality of geophones described in the present disclosure can be, but is not limited to 1-Component (C) vertical, 3-C, 4-C, vertical, and horizontal. The plurality of geophones is preferably configured to record data for time periods lasting several seconds. Furthermore, the plurality of geophones is preferably responsive to both compressional, longitudinal waves known as P-waves and shear, transverse waves known as S-waves. P-waves travel fastest in materials, so the P-wave is the first-arriving energy on a seismogram. Generally, P-waves have a higher frequency than the S-waves. P-waves in a liquid or gas are pressure waves, including sound waves. S-waves do not travel through fluids, so S-waves do not exist in Earth's liquid outer core or in air or water or molten rock (magma). S-waves travel slower than P-waves in a solid and, therefore, arrive after the arrival of P-waves.

The number of geophones used as the plurality of geophones is dependent on the overall area of the region of interest and thus, can vary in different embodiments of the present disclosure. Preferably, each of the plurality of geophones is equidistantly positioned within the region of interest. To do so, the region of interest is initially divided into a set of zones and an allotted number of geophones are assigned to each zone of the set of zones. In particular, the allotted number of geophones is selected from the plurality of geophones. An access node of each zone of the set of zones is used to access the data acquired by the allotted number of geophones. Other methods can be used to separate the region of interest as well. As an example, a typical survey area, which is the region of interest, might cover an area of 2500-squarekilometers ($km^2$). Geophone rows are organized within the region of interest with the plurality of geophones. In doing so, a gap between a selected geophone row and a subsequent geophone row is selected to be between 50 meters (m)-100 m. Moreover, each geophone within a geophone row is placed at 10-25 m intervals. Thus, in total, 50,000-100,000 geophones are used within the region of interest of 2500 $km^2$. However, a different number of geophones can be used as the plurality of geophones in a different embodiment where the region of interest is greater than or lesser than 2500 $km^2$. As an example, in another embodiment, the plurality of geophones can be used to form a typical grid configuration where each geophone line is stretched to 5000 m, while the receivers are spaced 25 m, and successive lines are spaced 500 meters.

In another embodiment, a set of data-acquisition units can be used in conjunction with the plurality of geophones, wherein each of the set of data-acquisition units may interface with a source encoder, which may be part of the vibroseis electronics or of electronics used in conjunction with a dynamite blaster, or an acoustic-data collector, or the like. The set of data-acquisition units may be placed in locations difficult for the plurality of geophones to be positioned in, which are cable-connected, or where radio contact is difficult. In certain embodiments, the set of data-acquisition units may be configured for continuous recording over different periods of time, such as periods of time that exceed one minute, periods of time that exceed one hour, and even periods of time that exceed one day. In one embodiment, a selected set of the data-acquisition units may record continuously for periods of time that exceed one week. In other embodiments, the set of data-acquisition units may be configured to toggle between on and off positions at predetermined times or in response to seismic vibrations within predetermined amplitude ranges. In either case, data representing a plurality of reflected-seismic waves may be stored on internal memory for later retrieval and processing.

In order to utilize the acquired seismic data, each of the plurality of geophones is communicably coupled with at least one remote server so that a set of data received at the plurality of geophones can be transferred to the at least one remote server for calculation and analyzing. More specifically, the set of data received at the plurality of geophones is from the reflected seismic waves within the region of interest. The plurality of geophones can communicate with the at least one remote server via methods that can be, but is not limited to, radio, cable, fiber optic link, and varying wireless communication methods.

As illustrated in FIG. 1, as an initial step of executing the method introduced in the present disclosure, a plurality of energy waves is transmitted into the region of interest through an external energy source (Step A). In a preferred embodiment of the present disclosure, the plurality of energy waves is transmitted through vibroseis, where a set of low frequency vibrations is emitted into the subsurface through the external energy source. The time period for emitting the set of low frequency vibrations can be, but is not limited to, 10 seconds. Having less ground damage, the ability to be used in urban areas, and being less sensitive to noise from impulsive sources such as footsteps, cars and traffic are some of the benefits of using vibroseis. The vibrator used for vibroseis is generally a large truck that has a base-plate in contact with the earth. A hydraulic jack and a heavy reaction mass (generally in the order of two tons) are incorporated in each vibrator to impart vibrations into the earth via the base-plate. The resulting vibration varies linearly, or some-times nonlinearly, over time between a lower-frequency limit (5 Hz) and an upper limit (150 Hz). Each sequence of the imparting of energy, according to such varying frequencies, is generally referred to as a "sweep" or source signature. Even though vibroseis is preferably used, other comparable energy wave emitting methods can also be used for transmitting the plurality of energy waves into the subsurface. As an example, seismic blasting caps or small amounts of explosives can be used in another implementation of the present disclosure. A set of data resulting from the plurality of energy waves is ultimately used for subsurface structure characterization. Additionally, the seismic data resulting from the plurality of energy waves can also be used to discover, delineate, and size hydrocarbon (oil and natural gas) reservoirs to produce, among other things, a drill map for onshore or offshore wells using seismic data.

After emitting the plurality of energy waves, a plurality of reflected-seismic waves is received by the plurality of geophones (Step B). The plurality of reflected-seismic waves is generated when the plurality of energy waves contacts and reflects from the plurality of subsurface layers, wherein the plurality of subsurface layers is within the region of interest. If required, the plurality of reflected-seismic waves can be broken up into frequency separated volumes. The frequency separated volumes can be, but is not limited to, high (e.g., between 80 Hz and 100 Hz for onshore data), low (e.g., between 3 Hz and 10Hz), and prime amplitude (e.g., between 12 Hz and 70 Hz) frequencies. In order to receive the plurality of reflected-seismic waves with varying frequencies, the plurality of geophones is preferred to be within an operating range of approximately 3 Hz-400 Hz.

During a seismic survey, seismic energy (e.g., acoustic energy) in the form of the plurality of energy waves, propagates downward into the subsurface and at each lithological facies and geologic boundary (e.g., an unconformity, bed boundaries, etc.), the seismic energy is reflected, refracted, and/or absorbed. Also, as the seismic wave front propagates into the underlying sediments, it attenuates, causing the frequency content of the seismic wave front to decrease with depth. For example high frequencies are better preserved near the earth's surface, are "drowned" by the more dominant, lower frequencies. In practice, spectral decomposition assesses seismic response at different, discrete frequency intervals. For example higher frequencies image thinner beds, while lower frequencies image thicker beds. While it is known in the art that seismic reflection from a thin bed has a characteristic expression in the frequency domain that is indicative of its thickness in time, the seismic response is non-unique and attenuation cannot be ascribed to a particular attribute.

Preferably, the plurality of subsurface layers is positioned within an area covering a potential subsurface trap believed to contain hydrocarbons. Geological factors that have to be present for the plurality of subsurface layers to produce oil and gas include: presence of a source rock (organic rich rock that has been subjected to high pressure and temperature over an extended period of time to form hydrocarbon), a structural, stratigraphic or combination trap to hold the hydrocarbons, impermeable seal or cap rock over the hydrocarbon trap in order to prevent hydrocarbons migrating or escaping to the surface, and porous reservoir rock that collects oil within its pores and that is permeable so that the hydrocarbons will flow to surface during production.

Since each of the plurality of reflected-seismic waves includes the characteristics of a reflection point within the subsurface, the plurality of subsurface layers can be retraced by analyzing the plurality of reflected-seismic waves. More specifically, by recording and analyzing data from the plurality of reflected-seismic waves at the plurality of geophones placed within the region of interest, an image of underground geological structures and a range of attributes related to the region of interest can be produced. Thus, the physical rock properties can be inferred accordingly. Moreover, surveys can be conducted along lines to produce a vertical profile (2D survey) or over an area to generate a 3D sub-surface volume.

After receiving the plurality of reflected-seismic waves, as a subsequent step of the present disclosure, the plurality of reflected-seismic waves is transferred to the at least one remote server. More specifically, the plurality of geophones initiates the transmission process that is eventually used for calculation and mapping purposes (Step C).

When the plurality of reflected-seismic waves is received at the at least one remote server, a set of Gabor frames is generated from a plurality of data within the plurality of reflected-seismic waves. The set of Gabor frames is generated through a Gabor frame-generating calculation module managed by the at least one remote server (Step D). In order to successfully execute the data compression process, the method of the present disclosure utilizes multiple windows, $g_n$, for the set of Gabor frames. By generating the set of Gabor frames for the plurality of data from the plurality of reflected-seismic waves, the present disclosure initiates a process of compressing the plurality of data embedded in the plurality of reflected-seismic waves. Upon generating the set of Gabor frames, a frame coefficient for each of the set of Gabor frames is quantized through a quantization process managed by the at least one remote server (Step E). The compression is beneficial for reasons that can be, but is not limited to, data management, data accuracy, and efficiency. As mentioned earlier, the plurality of reflected-seismic waves is generated from the plurality of subsurface layers. Therefore, as a final step of the process, the plurality of subsurface layers (Step F) is mapped by utilizing the frame coefficient of each of the set of Gabor frames, wherein the set of Gabor frames was generated from the plurality of reflected-seismic waves. The mapping of the plurality of subsurface layers, which is executed at the at least one remote server, is beneficial to understand the subsurface within the region of interest.

Frames are used as a component of the data analysis of the present disclosure. A frame, $\{f_i\}_{i \in I}$, in a Hilbert space represented by $\mathcal{H}$ is a set of two positive constants A and B such that the following expression holds true.

$$A\|x\|^2 \leq \sum_{i \in I} |\langle x, f_i \rangle|^2 \leq B\|x\|^2, \forall x \in \mathcal{H} \tag{1}$$

A, B—Frame bounds;
x—Arbitrary signal;
$\mathcal{H}$—Hilbert space;
f—Selected frame;
In equation (1), the constants A and B are frame bounds. A frame is known to be tight if A=B and a Parseval frame if A=B=1. Parseval frames are analogous to orthonormal bases since parseval frames conserve energy of a signal. Each frame is associated with a frame operator denoted by S, wherein S can be represented as:

$$Sf = \Sigma \langle f, e_j \rangle e_j$$

$\{e_j\}_{j \in J}$—is any sequence in $\mathcal{H}$;
S—Frame operator;

The frame operator S is positive, definite, and invertible. Equation (1) gives rise to the operator inequality $AI \leq S \leq BI$. (See Casazza et al.). The optimal (tightest) frame bounds for a frame are given by $B_{opt} = \|S\|_{op}$ and $A_{opt} = \|S^{-1}\|_{op}^{-1}$ where $\|\cdot\|_{op}$ is the operator norm of S.

Corresponding to each frame discussed earlier, there is a dual frame, $\{g_i\}_{i \in I}$, such that an arbitrary signal x in Hilbert space can be expanded or recovered by measuring $\{\langle f_i, x \rangle\}_{i \in I}$ according to the following equation (2):

$$x = \sum_{i \in I} \langle x, f_i \rangle g_i \qquad (2)$$

$g_i$—Dual frame;

The present disclosure discusses the use of a canonical dual frame. For a frame represented by $\{f_i\}_{i \in \mathbb{Z}}$, the canonical dual frame is given by $\{S^{-1} f_i\}_{i \in \mathbb{Z}}$. For a general frame, there can by multiple dual frames. However, for a tight frame, the dual frame is unique and the dual frame is the canonical dual frame. $g_i = S^{-1} f_i$ satisfies equation (2). Therefore, for a tight frame, the frame operator is AI and the inverse, $S^{-1}$, is I/A. Therefore, equation (2) can be rewritten as follows:

$$x = \frac{1}{A} \sum_{i \in I} \langle x, f_i \rangle f_i$$

When the concept of frames discussed above is used to structure the set of Gabor frames, a shift operator $T_a$ and a modulation operator $M_b$ of the set of Gabor frames can be derived as:

$$T_a x(t) = x(t-a)$$

$$M_b x(t) = e^{2\pi i b t} x(t)$$

t—time variable;
$M_b$—Modulation operator;
$T_a$—Time shift operator;

Based upon the definitions for the shift operator and the modulation operator, the Gabor frame is given precisely by the Gabor system $\{T_{na} M_{mb} g : n, m \in \mathbb{Z}\}$ that satisfies the frame condition of equation (1):

$$A\|x\|^2 \leq \sum_{m,n \in \mathbb{Z}} |\langle x, T_{na} M_{mb} g \rangle|^2 \leq B\|x\|^2, \forall x \in \mathcal{H}$$

Where:
a and b are lattice parameters and a,b>0;
arbitrary function—g;
$\mathbb{Z}$—Integer value;
n, m—elements of $\mathbb{Z}$;

The arbitrary function, g, in the above equation is known as the generator of the Gabor system $\{T_{na} M_{mb} g\}$. In the following section, the generation of the set of Gabor frames is further discussed since the present disclosure discusses a method of using multiple generators to develop the set of Gabor frames.

Figure 2:
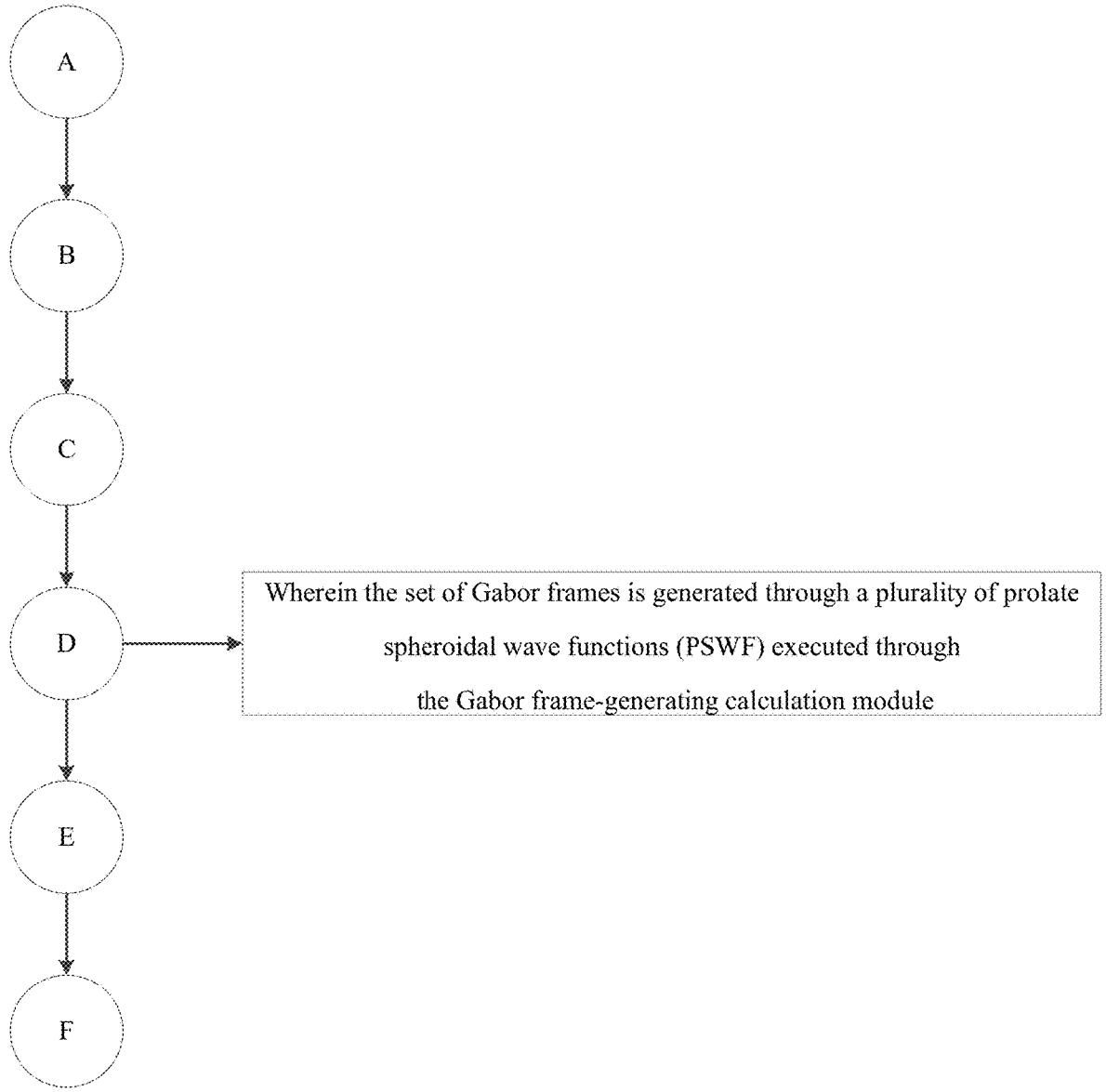
FIG. 2 is a flowchart illustrating the basic overall process of generating the set of Gabor frames through the plurality of prolate spheroidal wave functions (PSWF).
Figure 3:
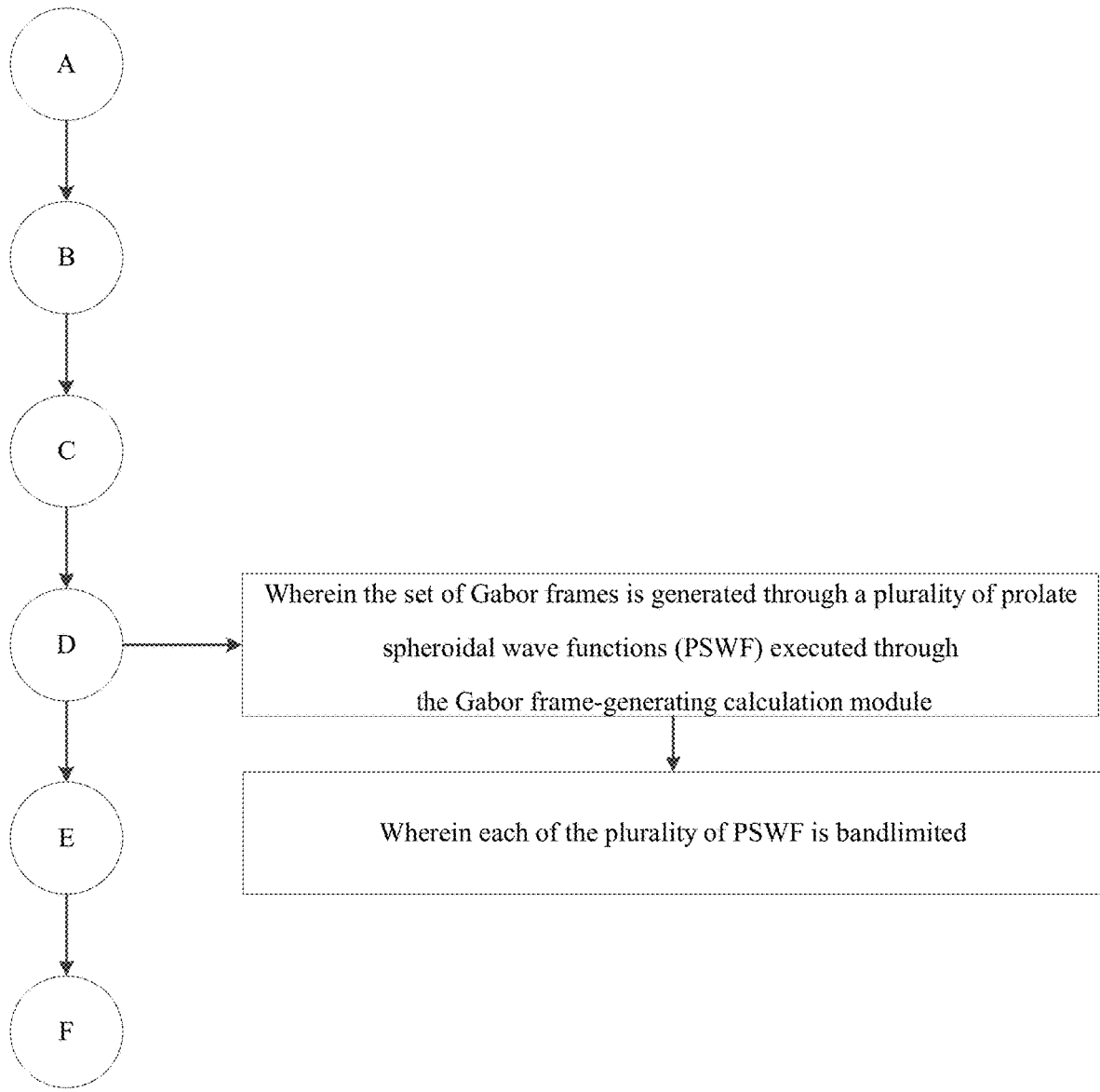
FIG. 3 is another flowchart illustrating the basic overall process of generating the set of Gabor frames, wherein each of the plurality of PSWF is bandlimited.

As illustrated in FIG. 2 and FIG. 3, in a preferred embodiment of the present disclosure, the set of Gabor frames is generated through a plurality of prolate spheroidal wave functions (PSWF) that is executed through the Gabor frame-generating calculation module. The plurality of PSWF is a set of orthogonal bandlimited functions, wherein each of the plurality of PSWF is a time-limiting operation followed by a low-passing operation.

Figure 4:
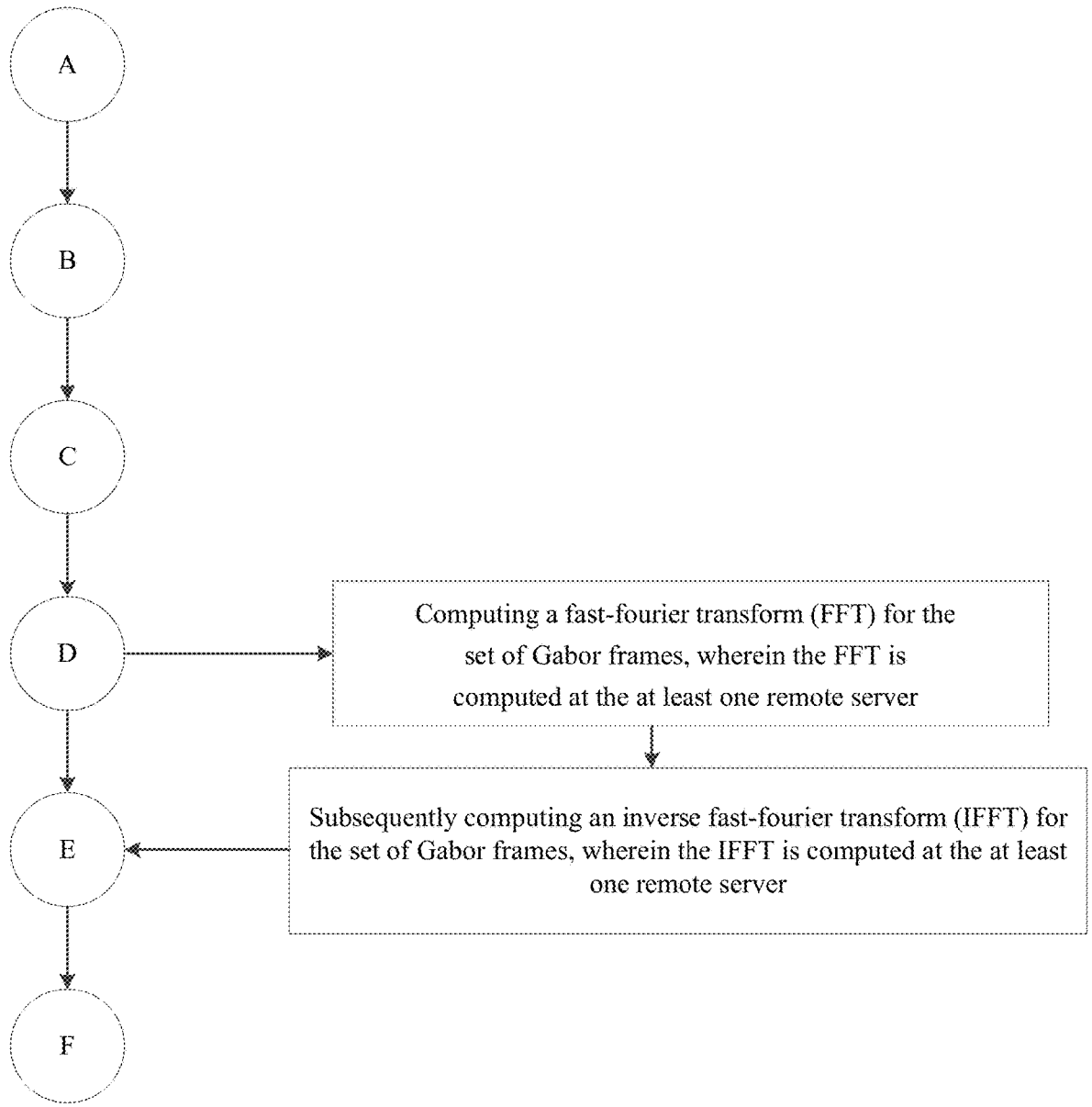
FIG. 4 is a flowchart illustrating the basic overall process of performing a fast-fourier transform and an inverse fast-fourier transform on the set of Gabor frames.
Figure 9:
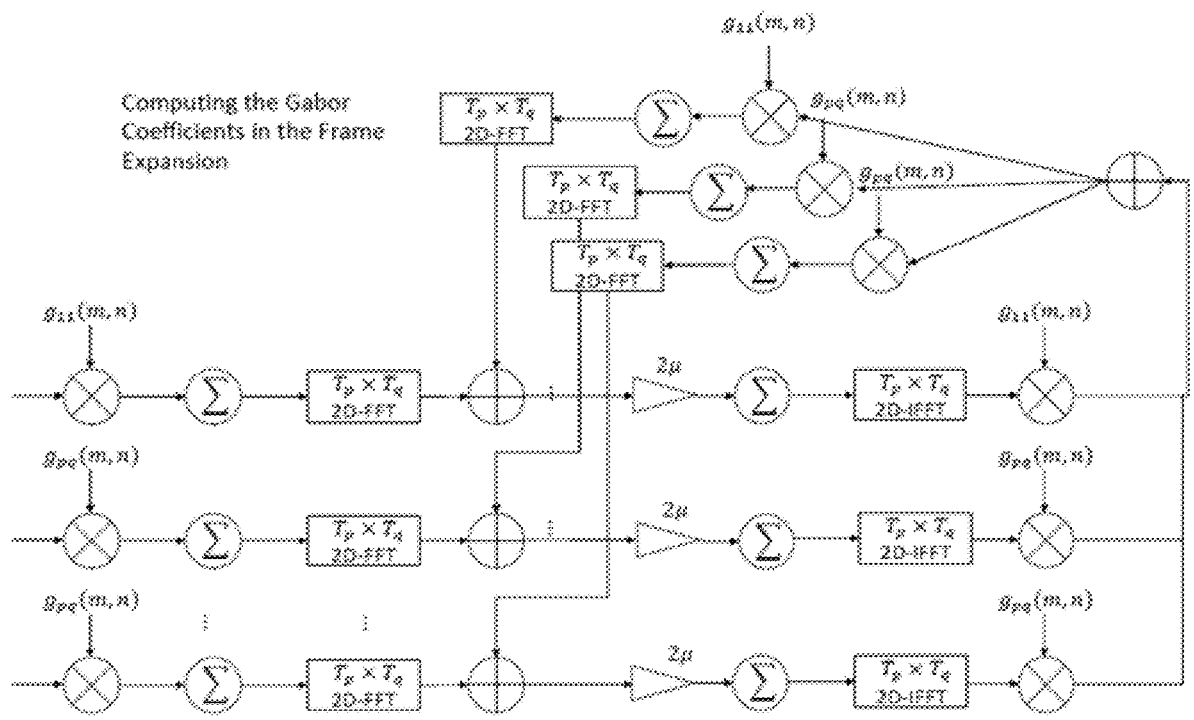
FIG. 9 is an overall view of the proposed calculation module to efficiently compute the Gabor coefficients.

In relation to the multiple generators discussed earlier, the plurality of PSWF represents the multiple generators used to develop the set of Gabor frames. Each of the plurality of reflected-seismic waves is bandlimited in temporal frequency and comprises a plurality of time-varying frequencies. Similarly, each of the plurality of PSWF is also bandlimited and maximally time/space concentrated on a finite interval. Thus, the plurality of PSWF can be used to expand each of the plurality of reflected-seismic waves into the set of Gabor frames. As illustrated in FIG. 4 and FIG. 9, in the process of generating the set of Gabor coefficients from the set of Gabor frames, the method of the present disclosure initially computes a fast-fourier transform (FFT) for the set of Gabor frames. Subsequently, the method of the present disclosure computes an inverse fast-fourier transform (IFFT) for the set of Gabor frames, wherein both the FFT and the IFFT are computed through the at least one remote server.

When generating the set of Gabor frames, the arbitrary function (g) mentioned earlier is a Gaussian window which is optimal for each of the set of Gabor frames. Since using only one arbitrary function offers time-frequency limitations governed by the Heisenberg uncertainty principle, the Gaussian window can be used to overcome these limitations. The Gaussian window with an uncertainty bound, wherein the uncertainty bound is measured as an average of time and frequency, is used with the method introduced in the present disclosure. The average of time and frequency can be measured through the following expression:

$$\int_{\mathbb{R}} t^2 |g(t)|^2 dt \cdot \int_{\mathbb{R}} t^2 |\hat{g}(f)|^2 df$$

R—real number;

Generally, an area covered by the Gaussian window for time-frequency localization is fixed for each of the set of Gabor frames. Thus, when a selected signal has multiple and/or time-varying frequencies, a single Gaussian window is insufficient to gather all time-frequency characteristics. Since the plurality of reflected-seismic waves has multiple and/or time-varying frequencies, multiple Gaussian windows need to be used in the process of generating the set of Gabor frames. One advantage of multiple Gaussian windows is preventing the loss of frequency resolution. Multiple Gaussian windows being equipped with traditional frequency modulation is another advantage. As a result, different frequencies of a signal can be accurately represented via multiple Gaussian windows.

The Zak transform is utilized to show that the plurality of PSWF actually form the set of Gabor frames. When a selected prolate of the plurality of PSWF is represented by g, the following equation is derived:

$$(\mathcal{Z}^\alpha g_r)(x, u) = \alpha^{1/2} \sum_{k \in \mathbb{Z}} g_r(\alpha(x+k)) e^{-2\pi i u k}$$

a, b—lattice parameters;
$g_r$—a selected prolate of the plurality of PSWF;
$Z^\alpha$—Zak transform of $g_r$;
k—integer value;

See A. J. E. M Janssen, "The Zak Transform: A Signal Transform for Sampled Time-Continuous Signals," in *Phillips J. Res.*, 43. pp. 23-69, 1988, incorporated herein by reference in its entirety.

When deriving the equation listed above, α is considered to be a fixed parameter of the Zak transform. Moreover, a, b>0 wherein a and b are parameters of a lattice on which the set of Gabor frames is defined on. A product of a and b is set to equal p/q, where p/q is a rational number. The parameters are defined such that α=1/b. Given that a=1, α=q/p. In this instance, the Zak transform is considered to be a unitary transform that is periodic/quasi periodic on a unit square defined by $[0,1]^2$. (See Janssen). The known characteristics of the Zak transform within a unit square are sufficient to determine that the set of Gabor frames can be generated through the plurality of PSWF.

An associated matrix, which relates the initial state and the final state of a system undergoing a scattering process, is used to characterize the properties of the set of Gabor frames, wherein a sequence of the set of Gabor frames is given by $\{\varphi_{r,n,m}\}=\{T_{na}M_{mb\varphi_r}\}$ with lattice parameters a and b. See Yehoshua Y. Zeevi, Meir Zibulski, and Moshe Porat, "Multi-window Gabor schemes in signal and image representations", Gabor Analaysis and Algorithms: Theory and Applications, Hans G. Feichtinger, Thomas Strohmer Eds., Springer Science, 1998, incorporated herein by reference in its entirety. Both a and b are selected to be rational and satisfy ab=p/q, with p, q $\in \mathbb{N}$. The (i, k) th entry of p×p matrix S is given by:

$$S_{i,k}(x,u) = \frac{1}{p}\sum_{r=0}^{R-1}\sum_{i=0}^{q-1} \mathcal{Z}\varphi_r\left(x-l\frac{p}{q}, u+\frac{i}{p}\right)\overline{\mathcal{Z}\varphi_r\left(x-l\frac{p}{q}, u+\frac{k}{p}\right)},$$

$$i, k = 0 \ldots p-1$$

S(x, u)—Associated matrix;
p/q—rational number;
$\varphi_r$—$r^{th}$ prolate of the plurality of PSWF;
l—signal length variable;
For the $\{\varphi_{r,n,m}\}$ sequence to form a Gabor frame of the set of Gabor frames, the following conditions should be satisfied.
(a) $\mathcal{Z}_{\varphi_r} \in L_\infty((0,1]^2)$ almost everywhere on the sequence;
(b) det(S)≥K>0 a.e. on [0, 1)×[0, 1/p);
When the set of Gabor frames is generated through the plurality of PSWF as in the method of the present disclosure, the Zak transform can be explicitly calculated. Based upon the conditions (a) and (b), the Zak transform for the plurality of reflected-seismic waves is in the form of:

$$(\mathcal{Z}f)(x, u) = \exp\{-2\pi i x u\}\hat{f}(u)$$

$\hat{f}(u)$—is the fourier transform of f(x).
(See Janssen). The fourier transform of the plurality of PSWF is given in terms of the plurality of PSWF as:

$$\hat{\varphi}_r(f) = (-1)^r i^r C_r \chi_\Omega(f) \varphi_r\left(\frac{Tf}{\Omega}\right)$$

$C_r$—a constant related to the $r^{th}$ prolate selected from the plurality of PSWF;
Ω—is the bandlimit of the $r^{th}$ prolate;
Moreover, the $r^{th}$ prolate is maximally concentrated within the time interval of [−T, T] and $\chi_\Omega$ is the characteristic function of the interval [−Ω, Ω]. See Jeffrey A. Hogan, Joseph D. Lakey, Duration and Bandwidth Limiting: Prolate Functions, Sampling and Applications, Springer Science, 2012, incorporated herein by reference in its entirety. Thus, the (i, k) entry of the matrix can be calculated as:

$$S_{i,k}(x,u) = \frac{1}{p}\sum_{r=0}^{R-1}\sum_{i=0}^{q-1} \mathcal{Z}\varphi_r\left(x-l\frac{p}{q}, u+\frac{i}{p}\right)\overline{\mathcal{Z}\varphi_r\left(x-l\frac{p}{q}, u+\frac{k}{p}\right)}$$

$$= \frac{1}{p}\sum_{r=0}^{R-1}\sum_{i=0}^{q-1} \varphi_r\left(\frac{T}{\Omega}\left(u+\frac{i}{p}\right)\right)\varphi_r\left(\frac{T}{\Omega}\left(u+\frac{k}{p}\right)\right)$$

$$e^{-2\pi i\left(x-l\frac{p}{q}\right)\left(u+\frac{i}{p}\right)} e^{2\pi i\left(x-l\frac{p}{q}\right)\left(u+\frac{i}{p}\right)}$$

$$= \frac{q}{p}\sum_{r=0}^{R-1} \varphi_r\left(\frac{T}{\Omega}\left(u+\frac{i}{p}\right)\right)\varphi_r\left(\frac{T}{\Omega}\left(u+\frac{k}{p}\right)\right)$$

In deriving the equation above, Ω is assumed to be Ω≥1 so that the characteristic function $x_\Omega(u+i/p)=1$ for all i=0, . . . , p−1, and the function $\varphi_r$ is normalized so that the constant factor $C_r$ cancels out.

When $\varphi_r$ is the $r^{th}$ prolate of the plurality of PSWF, and the sequence in consideration is represented as:

$$\{T_{na}M_{mb\varphi_r}\}_{n,m\in\mathbb{Z}, 0\leq r\leq R-1} \subset L^2(\mathbb{R})$$

a system of $\{T_{na}M_{mb\varphi_r}\}$ forms a Gabor frame of the set of Gabor frames, wherein ab<1. Moreover, a and b are time-frequency lattice parameters.

As discussed earlier, for a sequence to result in the set of Gabor frames, both condition (a) and condition (b) need to be satisfied. Since the plurality of PSWF is in $L^2(\mathbb{R})$, $\mathcal{Z}_{\varphi_r} \in L_\infty((0,1]^2)$, which is condition (a), is satisfied for time and frequency shifts. See D. Slepian and H. O. Pollak, "Prolate Spheroidal Wave Functions Fourier Analysis and Uncertainty—I," *The Bell System Technical Journal*, January 1961, incorporated herein by reference in its entirety. To satisfy condition (b), the plurality of PSWF needs to satisfy a Chebyshev system on the interval [−1,1]. (See Hogan et al.). To do so, the following determinant from equation (3) needs to be a non-zero value:

$$\Delta\begin{pmatrix}\varphi_0 & \varphi_1 & \cdots & \varphi_r \\ x_0 & x_1 & \cdots & x_r\end{pmatrix} = \det(\varphi_i(x_j))_{i,j=0}^n, \forall r \in \mathbb{Z}_+, \quad (3)$$

$$0 \leq x_0 < x_1 < \ldots < x_r \leq 1.$$

The condition of equation (3) can be explicitly written as:

$$\begin{vmatrix}\varphi_0(x_0) & \varphi_0(x_1) & \cdots & \varphi_0(x_r) \\ \varphi_1(x_0) & \varphi_1(x_1) & \cdots & \varphi_1(x_r) \\ \vdots & \vdots & & \vdots \\ \varphi_r(x_0) & \varphi_r(x_1) & \cdots & \varphi_r(x_r)\end{vmatrix} \neq 0$$

For any finite set $\{x_0, x_1, \ldots, x_r\} \subseteq [0, 1]$.

In order to verify condition (b), det(S)≥K>0 a. e. on [0; 1)×[0, 1/p), for p=2 and R≥p, the following equation is used:

$$\varphi_r(i) \equiv \varphi_r\left(u+\frac{i}{p}\right), i = 0, 1, \ldots, p-1$$

For R=2 (The case for R>2 is similar) and p=2, det(S) reads:

$$\begin{vmatrix} \varphi_0(0)\varphi_0(0)+\varphi_1(0)\varphi_1(0) & \varphi_0(0)\varphi_0(1)+\varphi_1(0)\varphi_1(1) \\ \varphi_0(1)\varphi_0(0)+\varphi_1(1)\varphi_1(0) & \varphi_0(1)\varphi_0(1)+\varphi_1(1)\varphi_1(1) \end{vmatrix}$$

Moreover, det(S) can be decomposed into four determinants as:

$$\begin{vmatrix} \varphi_0(0)\varphi_0(0) & \varphi_0(0)\varphi_0(1) \\ \varphi_0(1)\varphi_0(0) & \varphi_1(1)\varphi_0(1) \end{vmatrix} + \begin{vmatrix} \varphi_1(0)\varphi_1(0) & \varphi_1(0)\varphi_1(1) \\ \varphi_1(1)\varphi_1(0) & \varphi_0(1)\varphi_1(1) \end{vmatrix} +$$
$$\begin{vmatrix} \varphi_0(0)\varphi_0(0) & \varphi_1(0)\varphi_1(1) \\ \varphi_0(1)\varphi_0(0) & \varphi_1(1)\varphi_1(1) \end{vmatrix} + \begin{vmatrix} \varphi_1(0)\varphi_1(0) & \varphi_0(0)\varphi_0(1) \\ \varphi_1(1)\varphi_1(0) & \varphi_0(1)\varphi_0(1) \end{vmatrix}$$

Of the four determinants the first two determinants are converged to zero. A sum of the second two determinants is made equal to the following expression by taking out the common factors in entries of a given column:

$$\begin{vmatrix} \varphi_0(0) & \varphi_0(1) \\ \varphi_1(0) & \varphi_1(1) \end{vmatrix}^2$$

The equation above, which is a square, gives a non-zero value which satisfies the Chebychev assumption. When R>2 and p>2, the Cauchy-Binet formula is used for the determinant of the product of rectangular matrices. As a result of using the Cauchy-Binet formula for a Set $$\binom{[n]}{m},$$

which consists of a subset of length m of the set [n], the following results are obtained when 1, 2, . . . , n by [n]. See Jin Ho Kwak, Sungpyo Hong, Linear Algebra 2nd edition, Example 2.15 Binet-Cauchy formula, pp 66,7, Birkhäuser 2004, incorporated herein by reference in its entirety.

As an example, consider matrix A and matrix B, wherein matrix A is a m×n matrix and matrix B is a n×m matrix. For $$S \in \binom{[n]}{m},$$

the determinant of the product AB is given by the following expression for det(AB):

$$\det(AB) = \sum_{S \in \binom{[n]}{m}} \det(A_{[m],S})\det(B_{S,[m]})$$

A—m×n matrix;
B—n×m matrix;
when $A_{[m],S}$ is written for the m×m matrix, wherein the columns are from the columns of A at indices from S, and $B_{S,[m]}$ is written for the m × m matrix when rows are the rows of B at indices from S.
When the vector $\Phi(i)$ is defined as $\Phi(i)=[\varphi_0(i), \varphi_1(i)$ ⌿ ⌿ $\varphi_{R-1}(i)]^T$ for i=0, 1, . . . , p−1, the p×R matrix is given by the following expression:

$$A = \begin{bmatrix} \Phi(0)^T \\ \Phi(1)^T \\ \vdots \\ \Phi(p-1)^T \end{bmatrix}$$

$\Phi(i)$—Vector representation;
By using the Cauchy-Binet formula, the determinant of the S matrix can be written as follows:

$$\det(S) = \det(AA^T) = \qquad (4)$$
$$\det(A)^2 = \sum_{S \in \binom{[R]}{p}} \det(A_{[p],S})\det(A^T_{S,[p]}) = \sum_{S \in \binom{[R]}{p}} \det(A_{[p],S})^2$$

Considering the right-hand side of equation (4), the squares guarantee that the resulting values are positive. Moreover, the terms in equation (4) corresponds to the set S={0, 1, . . . , p−1}. The positive value of at least one of the terms in equation (4) shows that the plurality of PSWF satisfies a complete Chebyshev system.

The generation of the set of Gabor frames is beneficial for increased performance in compression. When the process of generating the set of Gabor frames is complete, the present disclosure extends the set of Gabor frames to Wilson-orthonormal bases through the Gabor frame-generating calculation module. Thus, an unconditional expansion is obtained for the plurality of reflected-seismic waves, wherein the unconditional expansion is optimal for data compression purposes.

Figure 5:
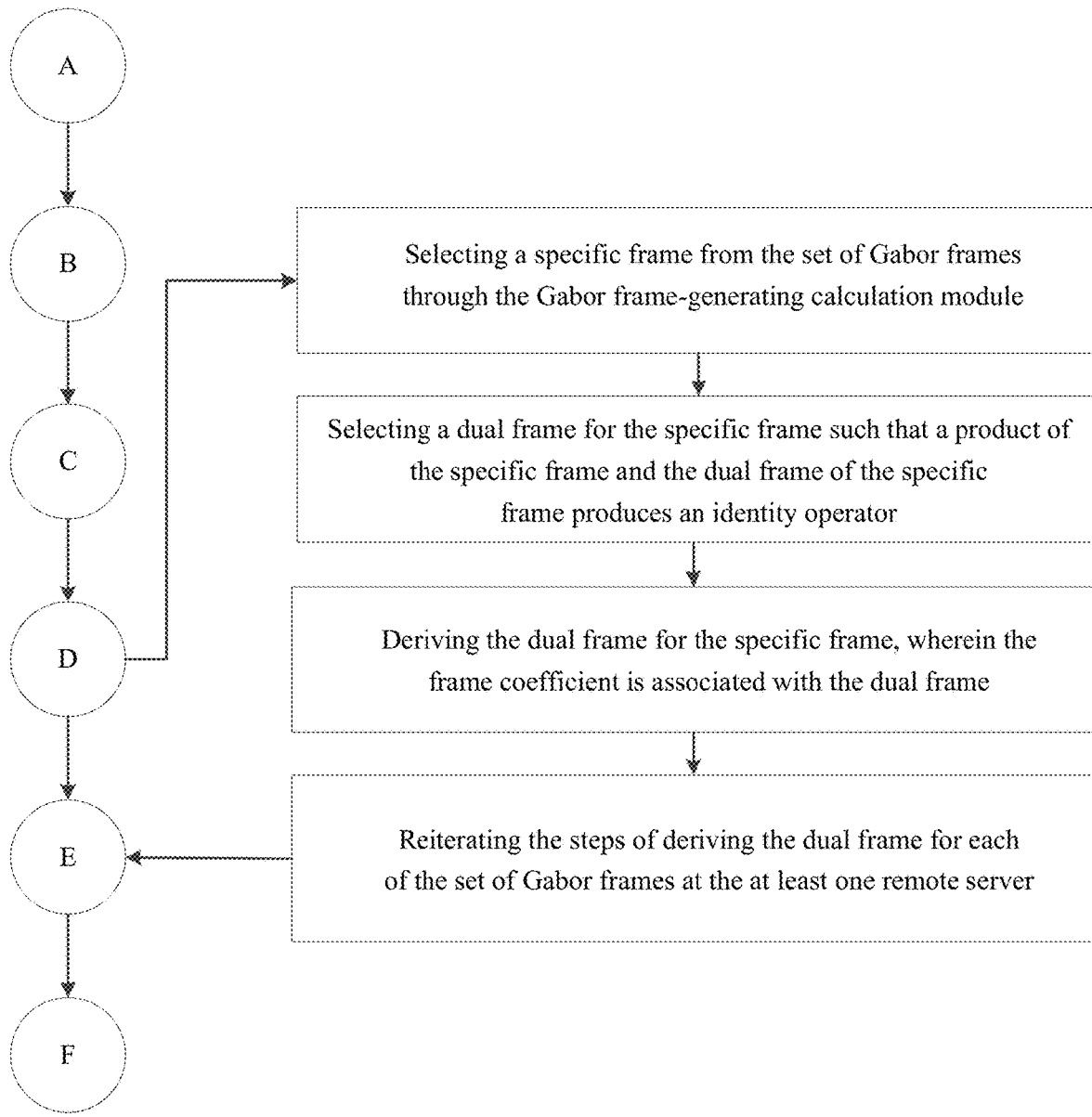
FIG. 5 is a flowchart illustrating the basic overall process of deriving the dual frame for each of the set of Gabor frames.

As detailed earlier in Step E, the method of the present disclosure quantizes the frame coefficient for each of the set of Gabor frames. In order to do so, a specific frame from the set of Gabor frames is selected through the Gabor frame-generating calculation module. Next, as illustrated in FIG. 5, a dual frame for the specific frame is selected such that a product of the specific frame and the dual frame produces an identity operator of the specific frame. As an example, when the identity operator is I, a frame F and its dual frame E satisfy the following condition:

FE=I

F—Frame;
E—Dual frame;
For finite frames, F consists of column vectors comprising of frame elements represented by $f_i$. Thus, the duality relation is symmetric.

Deriving the dual frame is important to analyze and synthesize the plurality of reflected-seismic waves. The process of selecting the dual frame is repeated such that the dual frame of each of the set of Gabor frames is derived. The dual frame for each of the set of Gabor frames is derived in the frequency domain. In the preferred embodiment of the present disclosure, the dual frame of each of the set of Gabor frames is a canonical dual frame of corresponding Gabor frame of the set of Gabor frames.

When S is the frame operator, the canonical dual frame is defined as $\{S^{-1}f_i\}_{i=1}^N$. Instead of the canonical dual frame, in embodiments of the present disclosure, other alternative duals such as the Sobolev duals and the Beta duals can also be used. See Blum, James, et al. "Sobolev duals in frame theory and sigma-delta quantization," *Journal of Fourier*

*Analysis and Applications* 16.3 (2010): 365-381; and Chou, Evan, and C. Sinan Güntürk. "Distributed noise-shaping quantization: I. Beta duals of finite frames and near-optimal quantization of random measurements." *Constructive Approximation* 44.1 (2016): 1-22, each incorporated herein by reference in their entirety. Since the set of Gabor frames is generated from the plurality of PSWF, the frame operator needs to be inversed. More specifically, $\{\varphi_0, \varphi_1 \ldots \varphi_{R-1}\}$ is generated by $\{S^{-1}\varphi_0, S^{-1}\varphi_1 \ldots S^{-1}\varphi_{R-1}\}$. The inversion process, which takes place in the frequency domain, results in equation (5) for functions f and g that are bandlimited to $[-\Omega/2, \Omega/2]$:

$$\frac{1}{L}\sum_{k=-\infty}^{\infty} f\left(\frac{k}{L}\right)\overline{g\left(\frac{k}{L}\right)} = \int_{-\infty}^{\infty} f(x)\overline{g(x)}\,dx \tag{5}$$

L—Length of signal;

Parseval's relation is used to verify the validity of equation (5). As a result, the frame operator S operates on a function f according to:

$$Sf = \sum_{r=0}^{R-1} \sum_{m,n} \langle f, \varphi_{r,m,n}\rangle \varphi_{r,m,n}$$

$$= \sum_{r=0}^{R-1} \sum_{m,n} \langle f, M_{mb}T_{na}\varphi_r\rangle M_{mb}T_{na}\varphi_r$$

$$= \sum_{r=0}^{R-1} \sum_{m} \sum_{n} \int_{-\infty}^{\infty} f(x) e^{-j2\pi mbx} \varphi_r(x-na)dx \times e^{j2\pi mbt}\varphi_r(t-na)$$

$$= \sum_{r=0}^{R-1} \sum_{m,n} \int_{-\infty}^{\infty} f(x) e^{-j2\pi mbx} e^{j2\pi mbt} \sum_{n} \varphi_r(x-na)\varphi_r(t-na)dx$$

If $1/a \geq \Omega$ or $a \leq 1/\Omega$, by utilizing $$x = \sum_{i \in I} \langle x, f_i\rangle g_i \tag{2}$$

The following is obtained:

$$Sf(t) = \sum_{r=0}^{R-1} \sum_{m} \int_{-\infty}^{\infty} f(x) e^{-j2\pi mb(x-t)} \int_{-\infty}^{\infty} \varphi_r(x-s)\varphi_r(t-s)ds\,dx$$

$$= \sum_{r=0}^{R-1} \int_{-\infty}^{\infty} f(x) \left(\sum_{m} e^{-j2\pi mb(x-t)}\right) \int_{-\infty}^{\infty} \varphi_r(x-s)\varphi_r(t-s)ds\,dx$$

$$= \sum_{r=0}^{R-1} \int_{-\infty}^{\infty} f(x) \left(\frac{1}{b}\sum_{m} \delta\left(x-t-\frac{m}{b}\right)\right) \int_{-\infty}^{\infty} \varphi_r(x-s)\varphi_r(t-s)ds\,dx$$

$$= \sum_{r=0}^{R-1} \sum_{m} \int_{-\infty}^{\infty} f\left(t+\frac{m}{b}\right)\frac{1}{b}\delta\left(x-t-\frac{m}{b}\right)$$

$$\int_{-\infty}^{\infty} \varphi_r(x-s)\varphi_r(t-s)ds\,dx$$

$$= \sum_{r=0}^{R-1} \sum_{m} \int_{-\infty}^{\infty} f\left(t+\frac{m}{b}\right)\frac{1}{b}\int_{-\infty}^{\infty} \delta\left(x-t-\frac{m}{b}\right)$$

$$\varphi_r(x-s)\varphi_r(t-s)ds\,dx$$

$$= \sum_{r=0}^{R-1} \sum_{m} \int_{-\infty}^{\infty} f\left(t+\frac{m}{b}\right)\frac{1}{b}\int_{-\infty}^{\infty} \varphi_r\left(t+\frac{m}{b}-s\right)\varphi_r(t-s)ds$$

$$= \sum_{r=0}^{R-1} \sum_{m} f\left(t+\frac{m}{b}\right)\frac{1}{b}\int_{-\infty}^{\infty} \varphi_r\left(u+\frac{m}{b}\right)\varphi_r(u)du$$

$$= \sum_{r=0}^{R-1} \sum_{m} f\left(t+\frac{m}{b}\right)\frac{1}{b}R_{\varphi_r}\left(\frac{m}{b}\right)$$

$R_{\varphi r}$: Auto-correlation function of the $r^{th}$ prolate;

The fourier transform of Sf(t) results in the following derivation:

$$\hat{S}f(\xi) = \sum_{r=0}^{R-1} \sum_{m} \hat{f}(\xi) e^{j2\pi \frac{m}{b}\xi} \frac{1}{b} R_{\varphi_r}\left(\frac{m}{b}\right)$$

$$= \sum_{r=0}^{R-1} \hat{f}(\xi) \sum_{m} \frac{1}{b} R_{\varphi_r}\left(\frac{m}{b}\right) e^{j2\pi \frac{m}{b}\xi}$$

$$= \sum_{r=0}^{R-1} \hat{f}(\xi) \sum_{n} \hat{R}_{\varphi_r}(\xi+nb)$$

$$= \sum_{r=0}^{R-1} \hat{f}(\xi) \sum_{n} |\hat{\varphi}_r(\xi+nb)|^2$$

$\xi$—random variable;

Assuming $f \in PW_\Omega \hat{S}f(\xi)$ is reduced to:

$$\hat{S}f(\xi) = \sum_{r=0}^{R-1} \hat{f}(\xi)|\hat{\varphi}_r(\xi)|^2$$

$$= \hat{f}(\xi)\hat{h}(\xi)$$

With equation (6) listed below:

$$\hat{h}(\xi) = \sum_{r=0}^{R-1} |\hat{\varphi}_r(\xi)|^2 \tag{6}$$

Utilizing the definition for $\hat{h}$, the frame operator is inverted in the frequency domain as:

$$\hat{S}^{-1}g(\xi) = \frac{\hat{g}(\xi)}{\hat{h}(\xi)} \tag{7}$$

Thus, the canonical dual frame for each of the set of Gabor frames can be generated. In the preferred embodiment, the following parameters are utilized in equation (6) and equation (7).

Figure 6:
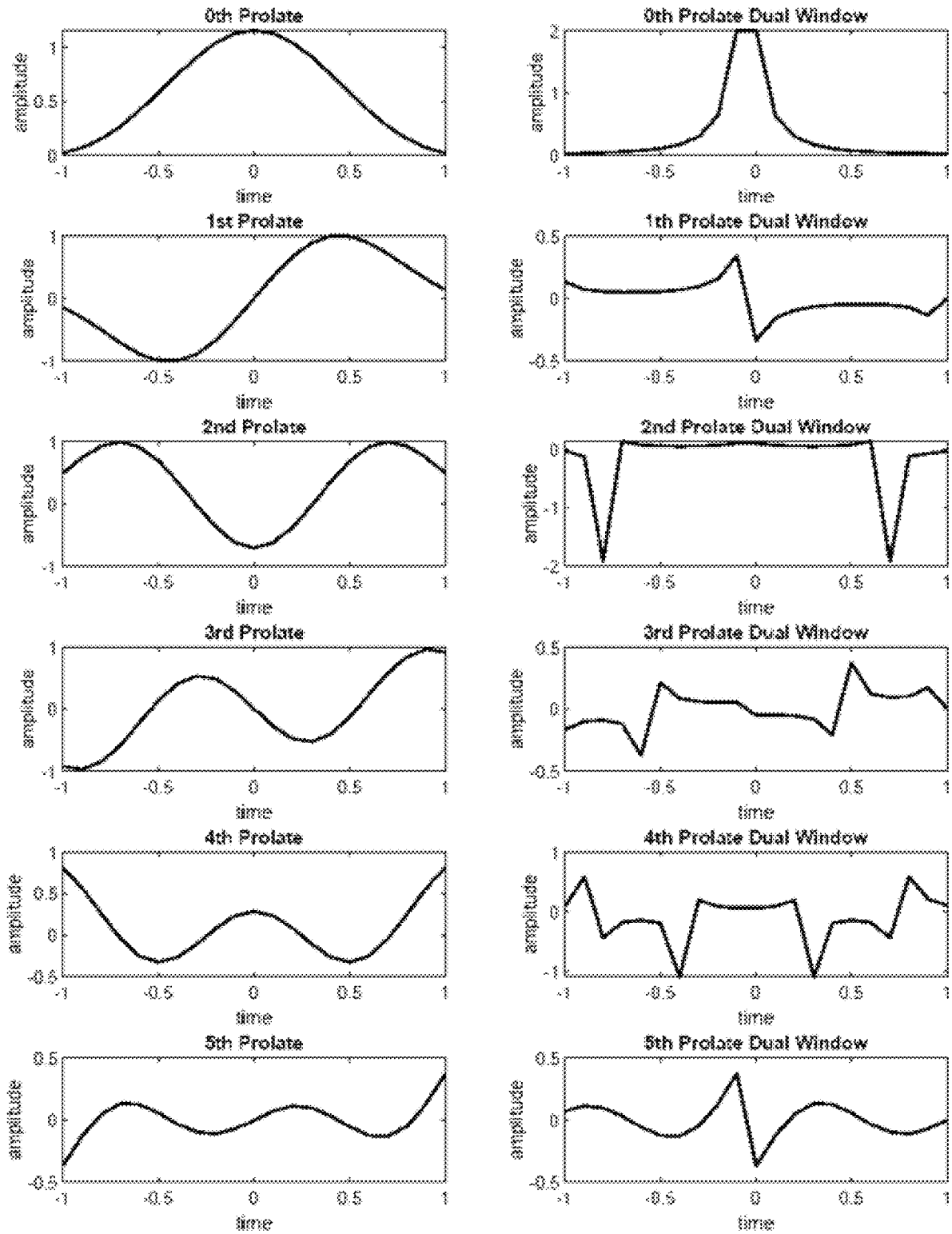
FIG. 6 is an illustration of the original frame windows and their corresponding windows.

Time bandwidth product=$2\Omega T$=6;

The number of prolates in the plurality of PSWF=6;

Time interval for the plurality of PSWF sampling=$[-1, 1]$;

Sampled length=50;
Time steps/transform=25;
Frequency stems/transform=2;

The corresponding dual frame for a selected frame from the set of Gabor frames is shown in FIG. 6.

Figure 7:
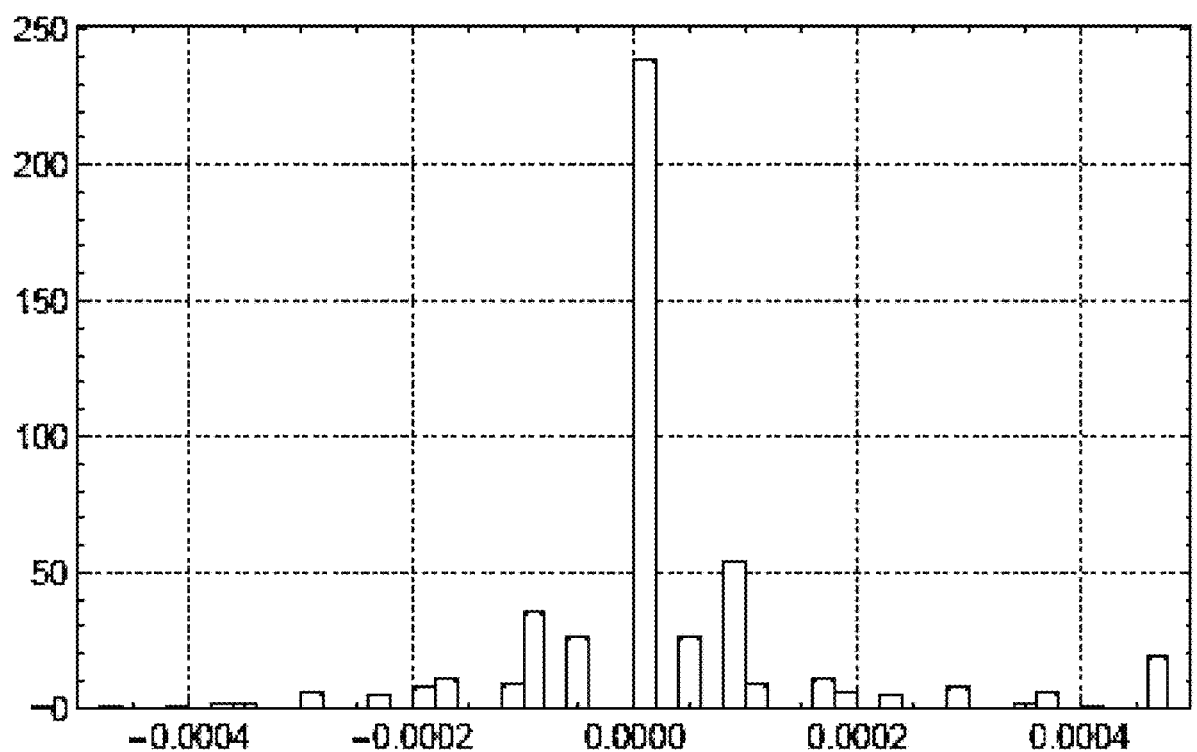
FIG. 7 is a histogram of scalar quantized Gabor coefficients for a segment of a trace.

To further enhance the compression results obtained from the quantization process, the quantization process of the present disclosure is based on a tree structured vector quantization (TSVQ) codebook. See A. Gersho, R. M. Gray, *Vector Quantization and Signal Compression*, Kluwer, Boston, 1992, incorporated herein by reference in its entirety. The resulting sparse vector with low entropy is shown in FIG. 7. As an example, for a codebook of size M and dimension k, the resolution is given by:

$$R = \frac{6\log_2 M}{k} \quad (8)$$

Figure 8:
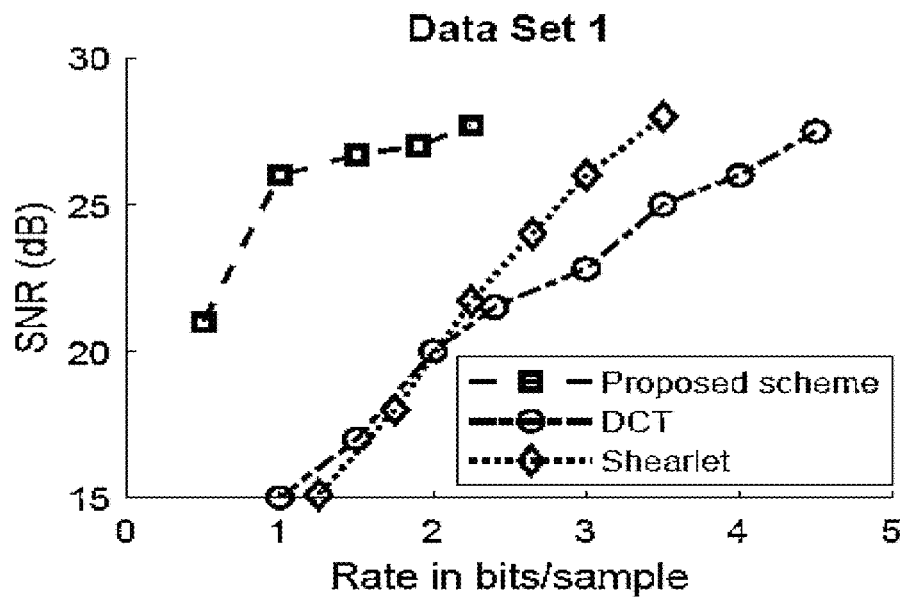
FIG. 8 is an illustration of the compression performance when the method of the present disclosure is implemented.
Figure 8:
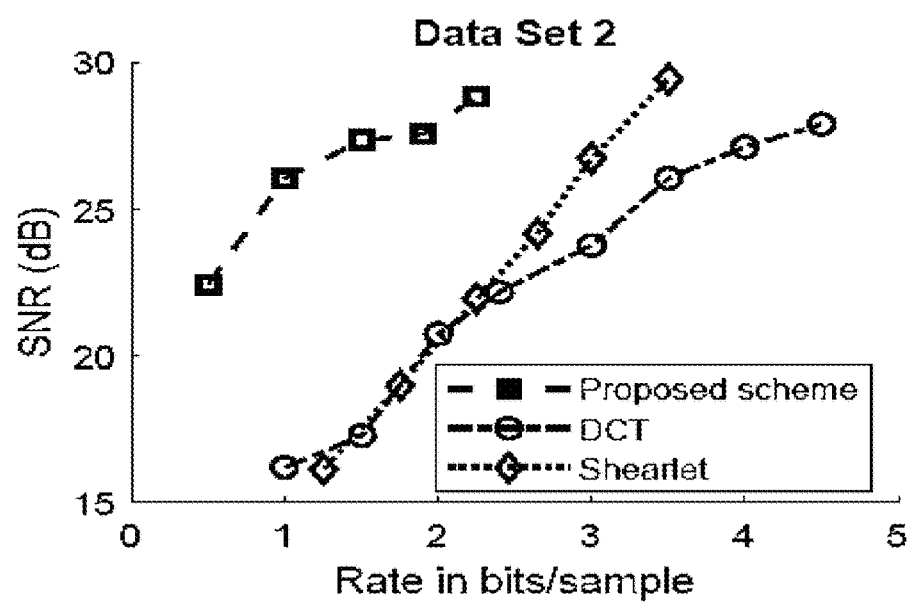

R—Overall rate of the resolution of the TSVQ codebook;
M—TSVQ Codebook size;
k—TSVQ Codebook dimension;

Referring to the equation (8), the factor 6 is from an expansion ratio or a redundancy of a corresponding Gabor frame selected from the set of Gabor frames. More specifically, the factor 6 comes from the expansion ratio or redundancy of the frame which 300 (25×2×6) for every 50 samples of the received signal. FIG. 8 shows the compression performance when the method of the present disclosure is used on different data sets.

Instead of working in a space defined by $L^2(\mathbb{R})$, a discrete complete space defined by $(\mathbb{C})^L$, where L is the length of the sampled signal, needs to be used in actual implementation. In the process, to ensure that a selected prolate from the plurality of PSWF is also a frame in $(\mathbb{C})^L$, the selected prolate needs to be verified via the Feichtinger Algebra $S_0(\mathbb{R})$. More specifically, a sample window of the selected prolate needs to be within a signal space defined by the Feichtinger Algebra $S_0(\mathbb{R})$. The disclosure discusses a method of utilizing numerical integration for verification purposes.

Feichtinger Algebra can be considered with respect to the short-time fourier transform (STFT) for a function f which is used to test function g which is given by the following time-frequency representation:

$$V_g f(t,\xi) = \int_\mathbb{R} f(y)\overline{g(y-t)}e^{-i2\pi y\xi}dy$$

g—test function;
$V_g f(t,\xi)$—Short-time fourier transform;

The discrete Gabor transform is a sampling of $V_g f(t,\xi)$ on a discrete time-frequency lattice. Considering the space of functions known as Feichtinger Algebra $S_0(\mathbb{R})$ where $g_0$ is the standard Gaussian, the following expression can be derived:

$$S_0(\mathbb{R}) = \{f \in L^2(\mathbb{R}) : \|f\|_{S_0} = \int_{\mathbb{R}\times\mathbb{R}} |V_{g_0}f(t,\xi)|\,dt\,d\xi < \infty\}$$

$g_0$—Standard gaussian;

Therefore, a window function that generates a Gabor frame $\{M_{mb}T_{na}g\}$ for $L^2(\mathbb{R})$ also yields a Gabor frame for the discrete space $\mathbb{C}^N$ through sampling and periodization. In the process of determining that a given window is of the Feichtinger class, the Feichtinger algebra may be characterized as:

$$f \in S_0(\mathbb{R}) \Leftrightarrow V f \in L^1(\mathbb{R}\times\mathbb{R}) \Leftrightarrow \int_\mathbb{R}\int_\mathbb{R} |\int_\mathbb{R} f(y)\overline{f(y-t)}e^{-i2\pi y\xi}dy|\,dt\,d\xi < \infty$$

See H. Feichtinger. "On a new Segal algebra" *Monatsh. Math.* 92:269-289, 1981, incorporated herein by reference in its entirety.

The plurality of PSWF can be tested for membership in $S_0$ by replacing f in above integral with a prolate selected from the plurality of PSWF. Since the integral is high dimensional, Monte Carlo integration is used to verify that the above integral is finite.

When the set of Gabor frames generated through the plurality of PSWF is discretized, a sampling operator $S_\delta$ for a given sampling rate $\delta > 0$ is given by:

$$S_\delta g_m = \sqrt{\delta}(g_m(\delta n))_{n\in\mathbb{Z}}$$

$\delta$ sampling rate;
and the periodization operator, represented by $P_L$ with period $K>0$ is given by:

$$P_L g_m(x) = \sum_{n\in\mathbb{Z}} g_m(x+Ln), \; x \in [0, L).$$

$P_L$—Periodization operator;
Upon discretizing the signal $g_m \in \ell^1(\mathbb{Z})$ the operator $P_L$ can be expressed as follows:

$$P_L g_m = \left(\sum_{n\in\mathbb{Z}} g_{m,j+Ln}\right)_{j=0,\ldots,L-1} \in \mathbb{C}^L$$

$\mathbb{C}^L$—Discrete signal space;

Through the above mentioned operators, signals are obtained in the finite discrete signal space $\mathbb{C}^L$ such as $P_L S_\delta g_m \in \mathbb{C}^L$. As discussed before, the sample window of the selected prolate needs to satisfy the Fiechtinger Algebra $S_0$. Thus, a discrete multi-gabor expansion is obtained for the plurality of reflected-seismic signals.

The present disclosure introduces a method for compressing seismic waveforms via a set of Gabor frames generated through a plurality of PSWF. In doing so, the present disclosure initially describes the generation of a Gabor frame through prolates defined by $L^2(\mathbb{R})$. In the process, the dual frame is derived for each of the set of Gabor frames. Subsequently, a tree structured vector quantization process is conducted to quantize and compress a frame coefficient associated with each of the set of Gabor frames. Simulation results from the method of the present disclosure portray improved performance compared to existing compression methods.

Figure 10:
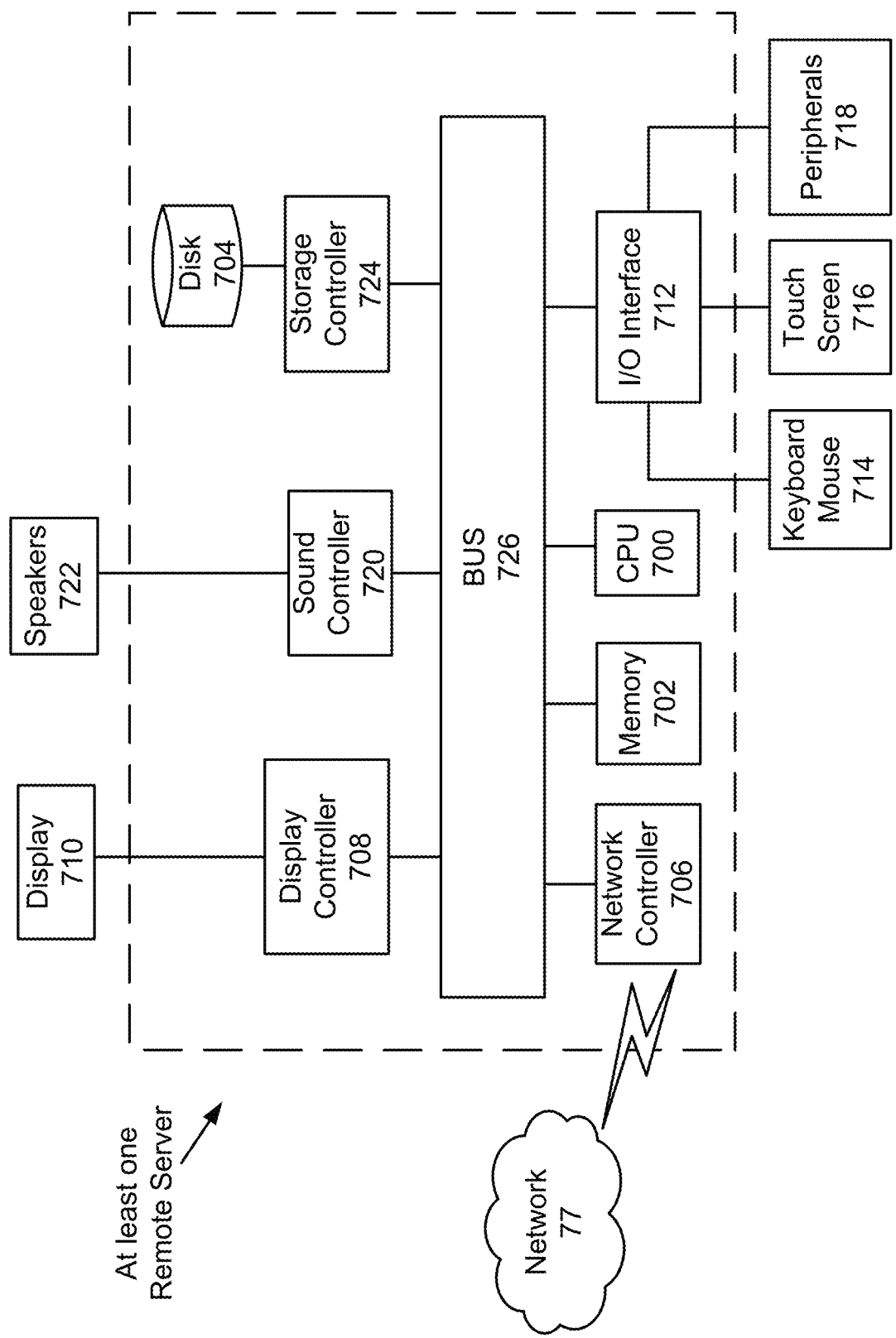
FIG. 10 is an illustration of a non-limiting example of details of computing hardware used in the computing system, according to certain embodiments.

Next, a hardware description of the at least one remote server according to exemplary embodiments is described with reference to FIG. 10. In FIG. 10, the at least one remote server includes a CPU 700 which performs the processes described above/below. The process data and instructions may be stored in memory 702. These processes and instructions may also be stored on a storage medium disk 704 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the at least one server communicates, such as a secondary server or computer.

Further, the claimed advancements may be provided as a utility application, background daemon, or component of an operating system, or combination thereof, executing in conjunction with CPU 700 and an operating system such as Microsoft Windows 7, UNIX, Solaris, LINUX, Apple MAC-OS and other systems known to those skilled in the art.

The hardware elements in order to achieve the at least one remote server may be realized by various circuitry elements, known to those skilled in the art. For example, CPU 700 may be a Xenon or Core processor from Intel of America or an Opteron processor from AMD of America, or may be other processor types that would be recognized by one of ordinary skill in the art. Alternatively, the CPU 700 may be implemented on an FPGA, ASIC, PLD or using discrete logic circuits, as one of ordinary skill in the art would recognize. Further, CPU 700 may be implemented as multiple processors cooperatively working in parallel to perform the instructions of the inventive processes described above.

The at least one remote server in FIG. 10 also includes a network controller 706, such as an Intel Ethernet PRO network interface card from Intel Corporation of America, for interfacing with network 77. As can be appreciated, the network 77 can be a public network, such as the Internet, or a private network such as an LAN or WAN network, or any combination thereof and can also include PSTN or ISDN sub-networks. The network 77 can also be wired, such as an Ethernet network, or can be wireless such as a cellular network including EDGE, 3G and 4G wireless cellular systems. The wireless network can also be WiFi, Bluetooth, or any other wireless form of communication that is known.

The at least one remote server further includes a display controller 708, such as a NVIDIA GeForce GTX or Quadro graphics adaptor from NVIDIA Corporation of America for interfacing with display 710, such as a Hewlett Packard HPL2445w LCD monitor. A general purpose I/O interface 712 interfaces with a keyboard and/or mouse 714 as well as a touch screen panel 716 on or separate from display 710. General purpose I/O interface also connects to a variety of peripherals 718 including printers and scanners, such as an OfficeJet or DeskJet from Hewlett Packard.

A sound controller 720 is also provided in the at least one remote server, such as Sound Blaster X-Fi Titanium from Creative, to interface with speakers/microphone 722 thereby providing sounds and/or music.

The general purpose storage controller 724 connects the storage medium disk 704 with communication bus 726, which may be an ISA, EISA, VESA, PCI, or similar, for interconnecting all of the components of the at least one remote server. A description of the general features and functionality of the display 710, keyboard and/or mouse 714, as well as the display controller 708, storage controller 724, network controller 706, sound controller 720, and general purpose I/O interface 712 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 11.

Figure 11:
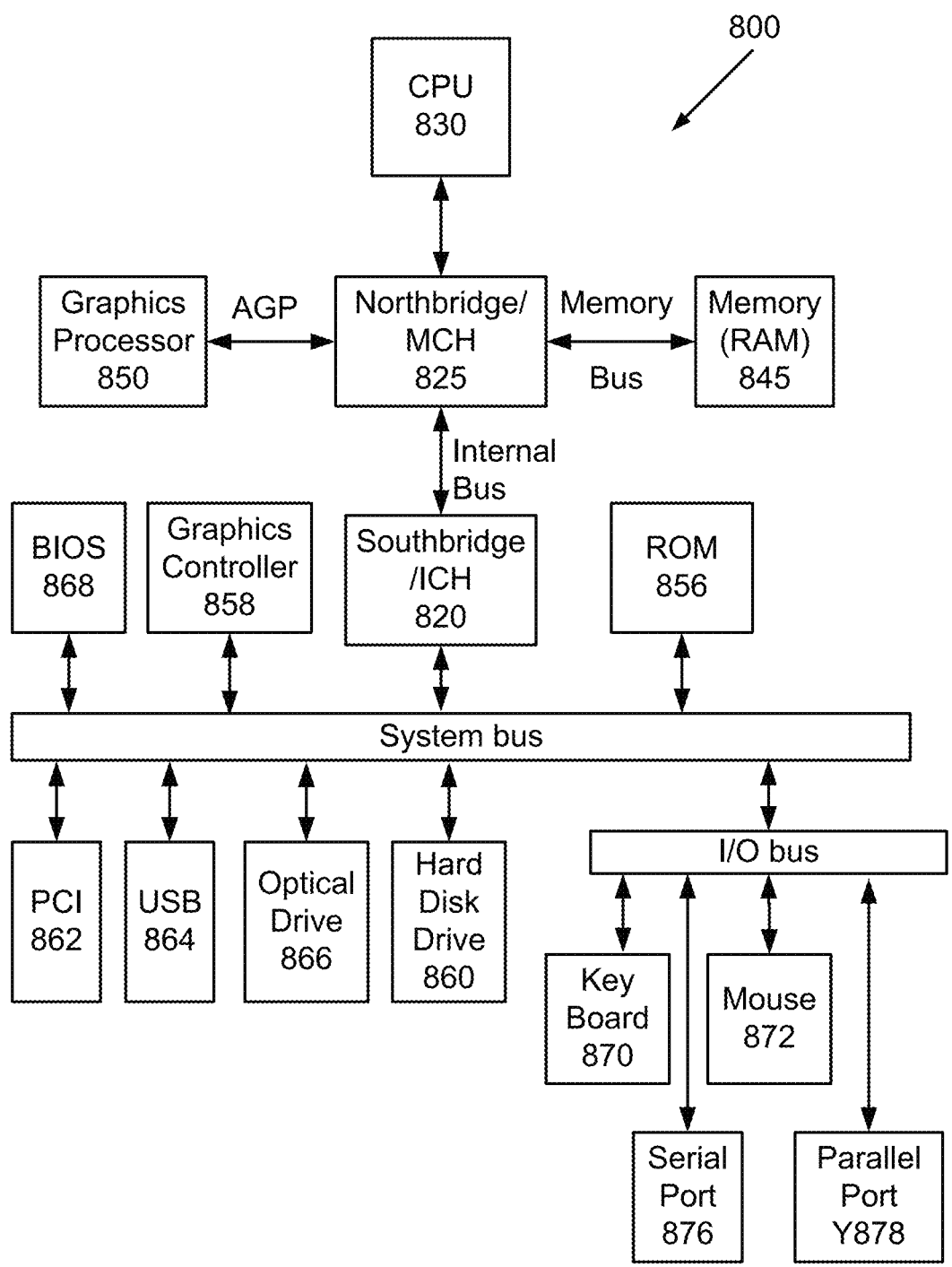
FIG. 11 is an exemplary schematic diagram of a data processing system used within the computing system, according to certain embodiments.

FIG. 11 shows a schematic diagram of a data processing system, according to certain embodiments, for performing data compression. The data processing system is an example of a computer in which code or instructions implementing the processes of the illustrative embodiments may be located.

In FIG. 11, data processing system 800 employs a hub architecture including a north bridge and memory controller hub (NB/MCH) 825 and a south bridge and input/output (I/O) controller hub (SB/ICH) 820. The central processing unit (CPU) 830 is connected to NB/MCH 825. The NB/MCH 825 also connects to the memory 845 via a memory bus, and connects to the graphics processor 850 via an accelerated graphics port (AGP). The NB/MCH 825 also connects to the SB/ICH 820 via an internal bus (e.g., a unified media interface or a direct media interface). The CPU Processing unit 830 may contain one or more processors and even may be implemented using one or more heterogeneous processor systems.

Figure 12:
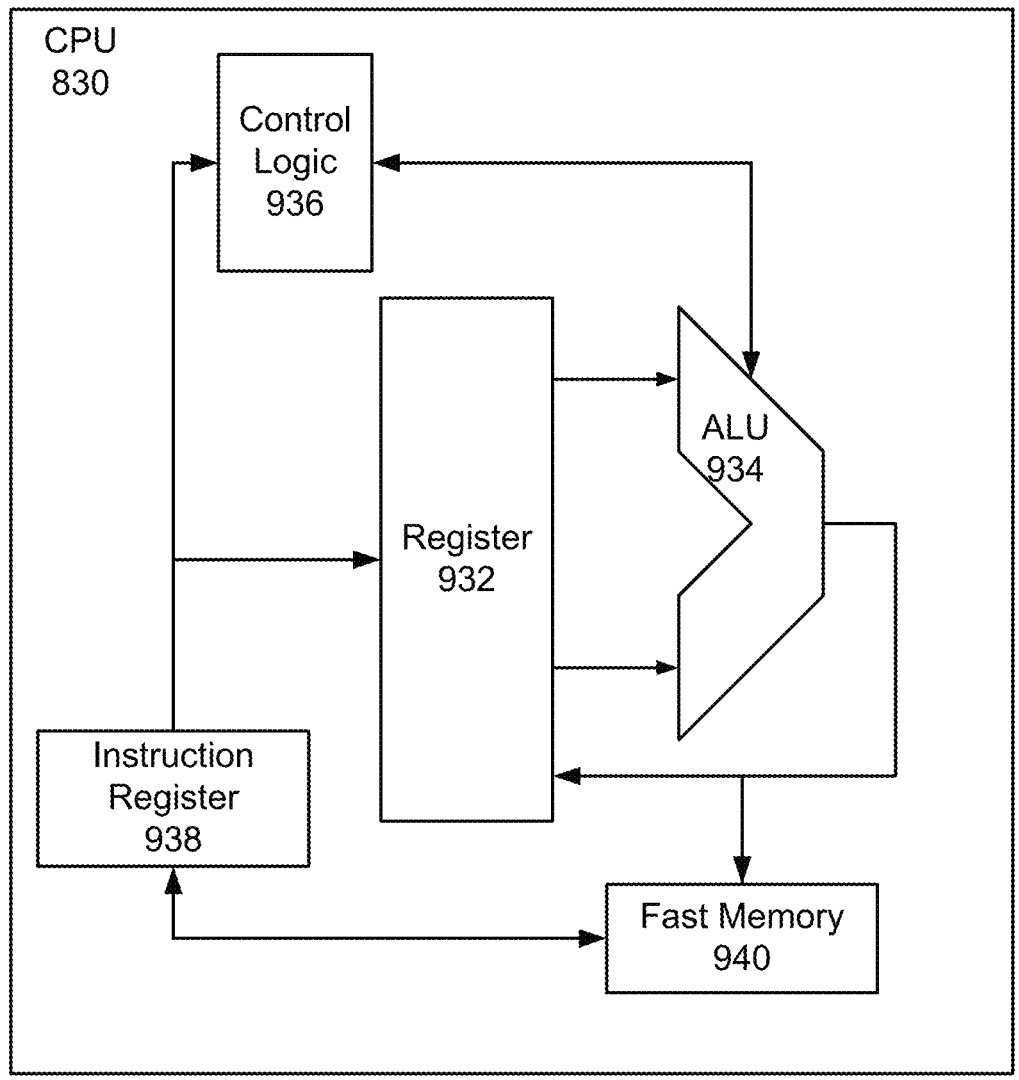
FIG. 12 is an exemplary schematic diagram of a processor used with the computing system, according to certain embodiments.

For example, FIG. 12 shows one implementation of CPU 830. In one implementation, the instruction register 938 retrieves instructions from the fast memory 940. At least part of these instructions are fetched from the instruction register 938 by the control logic 936 and interpreted according to the instruction set architecture of the CPU 830. Part of the instructions can also be directed to the register 932. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 934 that loads values from the register 932 and performs logical and mathematical operations on the loaded values according to the instructions. The results from these operations can be feedback into the register and/or stored in the fast memory 940. According to certain implementations, the instruction set architecture of the CPU 830 can use a reduced instruction set architecture, a complex instruction set architecture, a vector processor architecture, a very large instruction word architecture. Furthermore, the CPU 830 can be based on the Von Neuman model or the Harvard model. The CPU 830 can be a digital signal processor, an FPGA, an ASIC, a PLA, a PLD, or a CPLD. Further, the CPU 830 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 11, the data processing system 800 can include that the SB/ICH 820 is coupled through a system bus to an I/O Bus, a read only memory (ROM) 856, universal serial bus (USB) port 864, a flash binary input/output system (BIOS) 868, and a graphics controller 858. PCI/PCIe devices can also be coupled to SB/ICH 820 through a PCI bus 862.

The PCI devices may include, for example, Ethernet adapters, add-in cards, and PC cards for notebook computers. The Hard disk drive 860 and CD-ROM 866 can use, for example, an integrated drive electronics (IDE) or serial advanced technology attachment (SATA) interface. In one implementation the I/O bus can include a super I/O (SIO) device.

Further, the hard disk drive (HDD) 860 and optical drive 866 can also be coupled to the SB/ICH 820 through a system bus. In one implementation, a keyboard 870, a mouse 872, a parallel port 878, and a serial port 876 can be connected to the system bust through the I/O bus. Other peripherals and devices that can be connected to the SB/ICH 820 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 13:
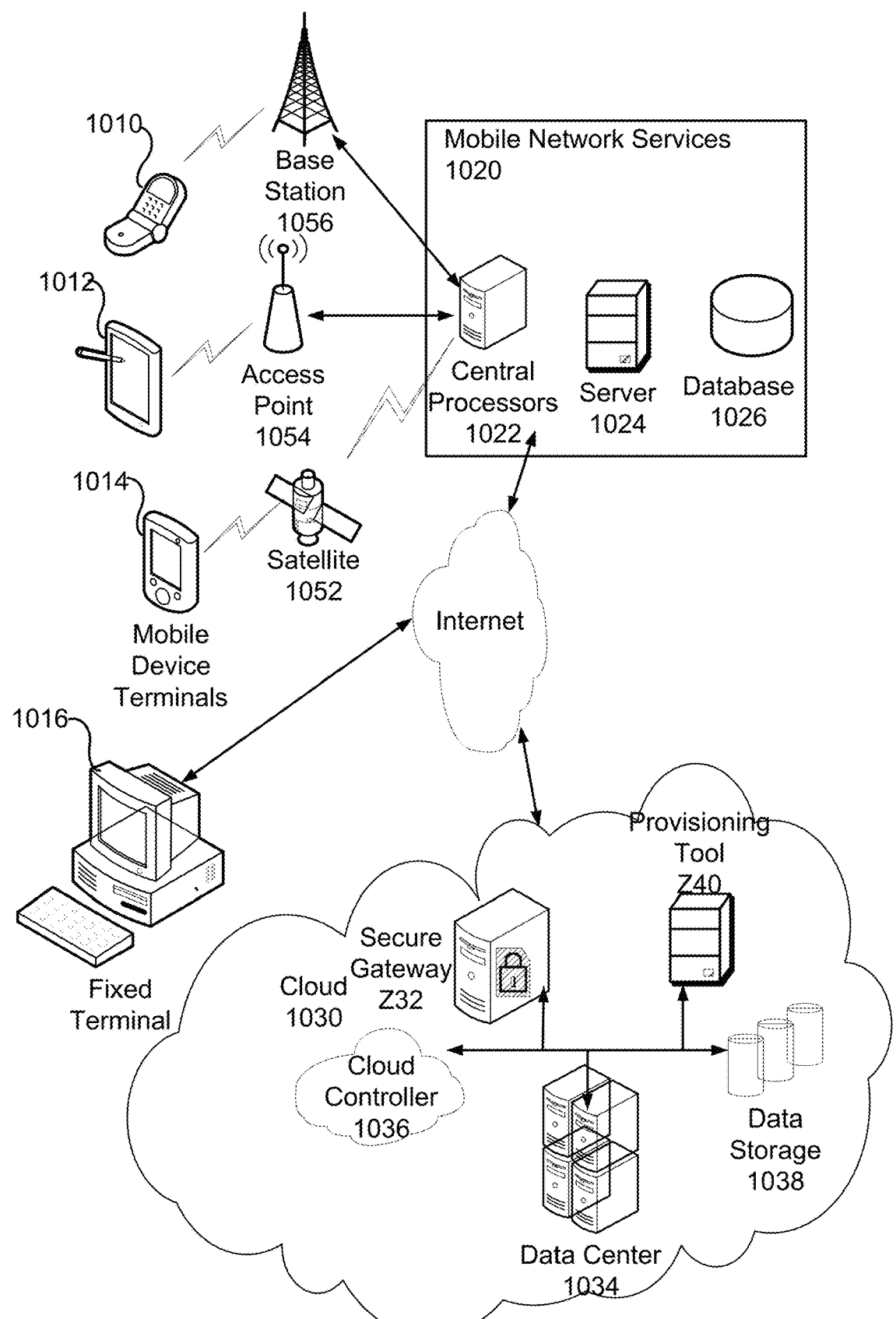
FIG. 13 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown on FIG. 13, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A method of compressing data from seismic waves using Gabor frames for subsurface geology mapping, comprising:
   transmitting a plurality of energy waves into the region of interest, wherein the plurality of energy waves is generated through an external energy source;
   receiving a plurality of reflected-seismic waves through a plurality of geophones, wherein the plurality of geophones stationed within a region of interest is communicably coupled with at least one remote server, wherein the plurality of seismic waves is generated when the plurality of energy waves reflect from a plurality of subsurface layers within the region of interest;
   transferring the plurality of reflected-seismic waves from the plurality of geophones to the at least one remote server;
   generating a set of Gabor frames for a plurality of data from the plurality of reflected-seismic waves, wherein the set of Gabor frames is generated through a Gabor frame-generating calculation module managed by the at least one remote server;
   quantizing a frame coefficient for each of the set of Gabor frames through a quantization process, wherein the quantization process is managed by the at least one remote server; and
   mapping the plurality of subsurface layers at the at least one remote server by utilizing the frame coefficient for each of the set of Gabor frames, wherein the plurality of subsurface layers is associated with the plurality of reflected-seismic waves.

2. The method of compressing data from seismic waves using Gabor frames for subsurface geology mapping as of claim 1, wherein the set of Gabor frames is generated through a plurality of prolate spheroidal wave functions (PSWF) executed through the Gabor frame-generating calculation module.

3. The method of compressing data from seismic waves using Gabor frames for subsurface geology mapping as of claim 2, wherein each of the plurality of PSWF is bandlimited.

4. The method of compressing data from seismic waves using Gabor frames for subsurface geology mapping as of claim 1 further comprises the steps of:
   computing a fast-fourier transform (FFT) for the set of Gabor frames, wherein the FFT is computed at the at least one remote server; and
   subsequently computing an inverse fast-fourier transform (IFFT) for the set of Gabor frames, wherein the IFFT is computed at the at least one remote server.

5. The method of compressing data from seismic waves using Gabor frames for subsurface geology mapping as of claim 1 further comprises the steps of:
   selecting a specific frame from the set of Gabor frames through the Gabor frame-generating calculation module;
   selecting a dual frame for the specific frame such that a product of the specific frame and the dual frame of the specific frame produces an identity operator;
   deriving the dual frame for the specific frame, wherein the frame coefficient is associated with the dual frame; and
   reiterating the steps of deriving the dual frame for each of the set of Gabor frames at the at least one remote server.

6. The method of compressing data from seismic waves using Gabor frames for subsurface geology mapping as of claim 1, wherein a dual frame for each of the set of Gabor frames is derived in a frequency domain.

7. The method of compressing data from seismic waves using Gabor frames for subsurface geology mapping as of claim 1, wherein a dual frame is a canonical dual frame of each of the set of Gabor frames.

8. The method of compressing data from seismic waves using Gabor frames for subsurface geology mapping as of claim 1, wherein the set of Gabor frames is extended to Wilson-orthonormal bases through the Gabor frame-generating calculation module.

9. The method of compressing data from seismic waves using Gabor frames for subsurface geology mapping as of claim 1, wherein the quantization process is based on a tree structured vector quantization (TSVQ) codebook.

10. The method of compressing data from seismic waves using Gabor frames for subsurface geology mapping as of claim 1, wherein each of the plurality of reflected-seismic waves comprises a plurality of time-varying frequencies.

11. The method of compressing data from seismic waves using Gabor frames for subsurface geology mapping as of claim 1, wherein each of the plurality of reflected-seismic waves is bandlimited.

12. The method of compressing data from seismic waves using Gabor frames for subsurface geology mapping as of claim 1, wherein the plurality of energy waves is generated through vibroseis.

* * * * *